(12) United States Patent
Ishikawa et al.

(10) Patent No.: US 7,466,912 B2
(45) Date of Patent: Dec. 16, 2008

(54) STORAGE APPARATUS

(75) Inventors: Kazuo Ishikawa, Chino (JP); Masao Kobayashi, Suwa (JP)

(73) Assignee: Eastman Kodak Company, Rochester, NY (US)

( * ) Notice: Subject to any disclaimer, the term of this patent is extended or adjusted under 35 U.S.C. 154(b) by 970 days.

(21) Appl. No.: 10/800,039

(22) Filed: Mar. 15, 2004

(65) Prior Publication Data

US 2005/0026035 A1    Feb. 3, 2005

(30) Foreign Application Priority Data

Aug. 1, 2003    (JP) .............. 2003-285426

(51) Int. Cl.
*G03B 17/02* (2006.01)
*H01M 2/10* (2006.01)
*H05K 1/14* (2006.01)

(52) U.S. Cl. ............... 396/539; 348/373; 429/100; 361/737

(58) Field of Classification Search ........... 396/277, 396/539; 348/373–376; 429/100; 386/118; 361/679, 737
See application file for complete search history.

(56) References Cited

U.S. PATENT DOCUMENTS

| | | | | |
|---|---|---|---|---|
| 4,645,325 A | * | 2/1987 | Inoue et al. ........... | 396/301 |
| 4,965,141 A | * | 10/1990 | Suzuki ........... | 429/9 |
| 5,601,939 A | * | 2/1997 | Zander ........... | 429/98 |
| 5,657,081 A | * | 8/1997 | Kurahashi ........... | 348/231.7 |
| 5,882,816 A | * | 3/1999 | Gotou ........... | 429/100 |
| 7,058,295 B2 | * | 6/2006 | Nishiwaki ........... | 396/539 |
| 2001/0006401 A1 | * | 7/2001 | Nakagawa et al. ........... | 348/233 |
| 2004/0212727 A1 | * | 10/2004 | Ariga ........... | 348/375 |

FOREIGN PATENT DOCUMENTS

| | | |
|---|---|---|
| JP | 64-6763 | 2/1989 |
| JP | 2-260379 | 10/1990 |
| JP | 3-34048 | 7/1991 |
| JP | 6-32393 | 4/1994 |
| JP | 6-44023 | 11/1994 |
| JP | 3088349 | 7/2000 |

* cited by examiner

*Primary Examiner*—W. B. Perkey
(74) *Attorney, Agent, or Firm*—Pamela R. Crocker

(57) ABSTRACT

A storage compartment for loading and unloading batteries of varying sizes efficiently. The storage compartment is internally equipped with a position regulating plate part on a ceiling part, an ejection urging part, a thickness judging part, and a contact point part on an end surface at the back side. The position regulating plate part is equipped with rotatable position regulating plates urged to protrude vertically into the storage compartment. When a battery is inserted, the position regulating plates guide the battery and cause it to be pressed to a bottom surface part of the storage compartment. Any one of the position regulating plates that does not abut the battery opposes the battery in a perpendicular direction and prohibits movement of the battery in the thickness direction.

24 Claims, 7 Drawing Sheets

STORAGE APPARATUS

FIELD OF THE INVENTION

The invention relates to a storage apparatus for, for example, a battery compartment apparatus of a digital still camera, which is capable of storing multiple types of batteries.

BACKGROUND OF THE INVENTION

Conventionally, storage apparatuses have been known, which are mounted loadably and ejectably in a condition where box-shaped objects such as batteries and IC cards are stored.

For example, the battery storage apparatus of Japanese Published Examined Utility Model Application No. 03-34048 is capable of storing two types of batteries, a lithium battery pack and an S-006P type battery, which is smaller than the lithium battery pack in external dimensions. The S-006P type battery, which is formed to fit the external shape of the lithium battery pack, is positioned to one side when it is inserted into the battery storage compartment by a side pressing member capable of elastically deforming and is pressed to be fixed by a top pressing member provided on a lid body.

However, the configuration disclosed by Japanese Published Examined Utility Model Application No. 03-34048 does not show how the battery is ejected and it is assumed that the battery drops out by its own weight when the lid body is opened, thus suggesting a need for improvements in usability. If the battery positioning is allowed to be determined by an elastically deforming member, the elastically deforming member is easily plastically deformed when a shock load is applied to the device or a load is applied to the battery, while, on the other hand, if the rigidity of the elastically deforming member is increased, a large force is required in loading the battery, thus resulting in poor usability.

The connector device of Japanese Published Laid-open Patent Application No. 02-260379 is capable of connecting multiple types of cards to a housing, for example, IC cards of different thicknesses having connector pins with one, two or three rows of contact holes of a connector device provided in a housing. While an IC card has a plurality of grooves, the housing has a plurality of protrusions that fit with the respective grooves and curved movable plates that elastically deform and press in the direction that cross with the inserting direction of the IC card in order to prevent insertion errors.

However, Japanese Published Laid-open Patent Application No. 02-260379 does not show the configuration for ejecting the card, so that there is a need for improvements in unloading. It also requires a specific shape of grooves on the object causing a problem of poor versatility.

The battery storage apparatus of Japanese Published Examined Patent Application No. 06-32393 is provided with a groove on the surface of the battery and a lock lever having a locking piece in the storage compartment to engage with said groove. When loading the battery, the insertion of the battery into the storage compartment causes the urged lock lever to turn to cause the locking piece to be engaged with the groove. When the inserting pressing force is removed at this point, the distal end of the battery will be pressed by the spring provided in the storage compartment in the direction opposite the insertion direction, causing the locking piece to engage with and locked to the groove so that the battery will remain locked in position. In unloading the battery, although an ejection button is provided, since an elastic member is provided between the ejection button and the lock lever, in a state where the locking piece is engaged with and locked to the groove, the elastic member is deformed and the lock is not released while pressing the ejection button. In order to release the lock, it is necessary to press the ejection button simultaneously with pressing the battery in the insertion direction so that the locking piece can be released from the groove.

The configuration of Japanese Published Examined Patent Application No. 06-32393 shows a configuration to unload batteries, but it does not show a configuration for holding the battery in a partially ejected condition, so that the operator has to support the unlocked battery with fingers, which means that there is a need for improvements in usability. Moreover, this configuration does not show how to load a plurality of batteries with different shapes.

The battery holding structure of Japanese Patent No. 3088349 provides a means for preventing the battery cover of a cellular phone from falling off by means of providing a hooking rib and a battery recess on the battery, and a rear case recess and a battery holder in the battery storage compartment of the rear case of the cellular phone. The battery is loaded in the battery storage compartment with the hooking rib being engaged with the rear case recess, and, as the battery cover is attached to the rear case, a battery fixing rib provided on the battery cover presses the battery holder to cause the battery holder to engage with the battery recess to fix the battery. On the other hand, the unloading of the battery requires pressing of the push button, which causes the battery cover to be removed from the rear case and the battery holder to disengage from the battery recess, allowing the battery to be removed.

However, Japanese Patent No. 3088349 shows no configuration for holding the battery in a partially ejected state. Moreover, this configuration does not show how to load a plurality of batteries with different shapes.

In the case of a vacuum cleaner of Japanese Published Examined Utility Model Application No. 64-6763, a pair of battery projection parts is protrudingly provided on the side of the battery, a pair of battery holding ribs is provided in the battery storage compartment of the main body extending along the battery insertion direction, and a plurality of protrusions are provided on each battery holding rib at a predetermined interval in the battery insertion direction. When loading a battery, is removed the battery cap, and the battery is pressed in while aligning the battery holding ribs between the battery projection parts. At this time, the protrusions abut against the battery projection parts and the battery holding ribs deform elastically. On the other hand, in order to remove the battery, the battery cap in a direction in which the battery falls out is removed and the main body is tilted to move the battery to slide out by its own weight. Then, the battery stops when the battery projection parts abut against the protrusions, and the battery is ready to be pulled out by hand at this point.

However, since the load resistance caused by the elastic deformation of the permanently fixed battery holding ribs are used for preventing the battery from dropping in the configuration of Japanese Published Examined Utility Model Application No. 64-6763, a high load resistance at the time of insertion is a problem. Also, since it does not provide a structure for moving the battery in an ejecting direction, rather it relies on the gravity for moving the battery, it is necessary to tilt the main body for removing the battery, presenting a problem of poor usability. Additionally, it does not disclose any configuration for loading a plurality of batteries of different shapes and it is only usable for a battery with battery projection parts that are aligned with the battery holding ribs.

The battery loading and unloading mechanism according to Japanese Published Examined Utility Model Application No. 06-44023 is designed for loading and unloading a battery pack into a battery charger, and the battery pack storage compartment is equipped with a battery frame that abuts against the distal surface of the battery inserted from an insertion port and a slide lever that protrudes at the insertion port and abuts against the rear end surface of the battery. The battery frame is urged in the battery ejecting direction by springs. A knob is connected to the slide lever, and the slide lever is urged by a spring attached to the knob in the direction projecting it to the insertion port. The insertion port is equipped with a cover that is mounted in the inside of the battery pack storage compartment in a rotatable manner pressed by the battery, so that it can cover the insertion port when the battery is not loaded. In loading the battery, the knob is operated against the urging force of the spring and the battery is pressed in through the insertion port together with the battery frame resisting the urging force of the spring while the slide lever is retracted from the insertion port. When the battery is loaded into the battery pack storage compartment completely to the rear end surface of the battery, the slide lever protrudes into the insertion port to be locked with the rear end surface of the battery, thus holding the battery in a locked condition. In order to unload the battery, the knob is operated against the urging force of the spring to retract the slide lever from the insertion port, so that the battery is partially ejected together with the battery frame due to the urging force of the spring.

However, this configuration of Japanese Published Examined Utility Model Application No. 06-44023 does not show how to load a plurality of batteries with different shapes. Moreover, it is necessary to operate the knob to retract the slide lever from the insertion port, presenting a problem of a complicated operation. It also presents a problem of ejecting the battery where the battery can pop out unless the insertion port is facing upward, as there is no configuration to hold the battery in a condition partially ejected from the battery frame.

As can be seen from the above, the conventional configurations capable of loading multiple types of objects and guiding the objects with guiding members capable of elastic deformations have problems where the guiding members tend to cause plastic deformation under impact so that it is difficult to hold the objects in a stable manner if the rigidity of the guiding members is low, while it requires a large force in loading and results in poor usability if the rigidity of the guiding members is high. Also, while it is required to have a configuration that is capable of loading multiple types of objects and of loading and unloading the objects with ease, the simple combination of providing the capability of supporting multiple types of objects and improved usability tend to cause the structure to become complicated and raise the manufacturing cost and also cause a problem of making the device large in size.

The present invention was made considering these problems and is intended to provide a storage apparatus that is capable of loading multiple types of objects, loading and unloading the objects with excellent usability with a simple structure.

SUMMARY OF THE INVENTION

The storage apparatus according to the present invention comprises: a storage compartment for storing an object; a reference receiving part provided in said storage compartment; and a plurality of regulating members that are rotatably and pivotably supported and urged in the direction to be protruded substantially perpendicular to said reference receiving part of said storage compartment, wherein, at least one of said regulating members is pressed to said object inserted into said storage compartment to rotate against the urging force, and presses said object toward said reference receiving part, while the other regulating members are held in a condition of opposing substantially perpendicular to said reference receiving part and said object.

This configuration is capable of guiding the object inserted into the storage compartment with the abutting regulating members to press them against the reference receiving part of the storage compartment, thereby regulating the position. Moreover, by providing a regulating member that faces each object substantially perpendicular to regulating members that do not press the object against the reference receiving part of the storage compartment, this causes these regulating members to abut the object, thereby making possible to regulate the object position firmly without an urging force. Thus, it is possible to load the object easily and hold the object securely at a prescribed position of the storage compartment.

According to the present invention, the urging force of the regulating member for pressing the object is set larger as the external shape of the object is larger.

With this configuration, it is possible to securely guide an object with a large external shape to press it against the reference receiving part of the storage compartment, thereby making it possible to regulate the position.

The present invention comprises: an ejecting means for urging the object in the direction to eject from the storage compartment; and a locking means for holding the object in a prescribed position of the storage compartment against the urging force of this ejecting means.

This configuration makes it possible to securely hold the object in a stable manner at a prescribed position with an urging force of the ejecting means by locking the locking means, and, the object can be ejected from the storage compartment with the urging force of the ejecting means by releasing the locking means, thereby making possible to improve the usability of loading/unloading.

According to the present invention, a load in the ejecting direction by the ejecting means is set larger than a load in which a load due to the mass of the object in the direction opposite the ejecting direction is added with a friction resistance load in the direction opposite the ejecting direction for which the regulating member abuts the object.

This configuration makes it possible to securely eject the object against the load in the direction opposite the ejecting direction, thereby improving the usability of ejecting operation.

The present invention comprises: a storage compartment for storing an object; a reference receiving part provided in said storage compartment; a regulating member, which is pivotably supported so as to rotate and urged in the direction to protrude toward said reference receiving part of said storage compartment, and which has a contact part that abuts said object; an ejecting means for urging the object in the direction to eject from the storage compartment; and a locking means for holding the object at a prescribed position of the storage compartment against the urging force of this ejecting means, wherein, said regulating member is pressed to the object inserted in a prescribed position of the storage compartment to rotate against the urging force, and presses said object against said reference receiving part, while said contact part abuts said object and applies a prescribed friction resistance load in the direction opposite the ejecting direction.

This configuration is capable of guiding the object inserted into the storage compartment with the abut regulating members to press it against the reference receiving part and regulating the position. It is further capable of holding the object at a prescribed position of the storage compartment by locking the locking means and with the urging force of the ejecting means. It is also capable of ejecting the object only by a fixed amount with the urging force of the ejecting means by releasing the locking means, in addition, preventing the object from dropping by the friction resistance load of the contact part. During insertion of an object, the regulating member provided with the contact part rotates in the receding direction, thereby reducing the force necessary for inserting operation, at the same time, in the ejection of an object, the contact part provided in the regulating member slidably contacts in the biting direction, thereby securely preventing the object from dropping and improving the usability of loading/unloading.

According to the present invention, a load in the ejecting direction provided by the ejecting means is set larger than a load in which a friction resistance load in the direction opposite the ejecting direction for which the contact part of the regulating member abuts the object is added with a load due to the mass of said object in the direction opposite the ejecting direction, at the same time, a friction resistance load due to the mass of said object in the ejecting direction is set larger than a load in the direction opposite the ejecting direction for which the contact part of the regulating member abuts the object.

This configuration makes it possible to hold the object in a condition where the object is ejected only by a fixed amount by releasing the locking means regardless of the attitude direction of the storage apparatus.

According to the present invention, a load in the ejecting direction of the ejecting means is set to be larger, the larger the external shape of the object becomes.

This configuration allows the object to be ejected with an appropriate ejecting force in accordance with the external shape of the object.

According to the present invention, the larger the external size of the object is, the larger the friction resistance load in the direction opposite the ejecting direction for which the contact part of the regulating member abuts the object.

With this configuration, in accordance with the object easily tending to drop as the external shape of the object is large, and the larger the external shape of the object is, the larger the load in the ejecting direction of the ejecting means is set, the object can be held in a condition where the object is ejected only by a fixed amount by an appropriate friction resistance load in accordance with the external shape of the object.

According to the present invention, said reference receiving part of the storage compartment is provided with a friction resistance member that generates a friction resistance load in the direction opposite the ejecting direction as a result of its abutting the object.

With this configuration, the load by the friction resistance member acts as an additional force to the friction resistance load by the contact part provided on the regulating member in the direction opposite the ejecting direction, thereby efficiently preventing the object from dropping without increasing the urging force of the regulating member.

According to the present invention, said storage compartment is provided with an urging part which urges the regulating member against the object side to press the contact part to the object when the object of a greatest shape is loaded.

This configuration makes it possible to effectively prevent the object of the greatest shape from dropping without having to increase the urging force of the regulating member even in cases where the angle of the abutment between the contact part and the object is shallow and the action of engagement is small, or the mass of the object of the greatest size is particularly large, as a result of an urging part that increases the urging force that is applied to the contact part for the object of the largest size.

The present invention comprises an urging force adjustment means for adjusting the urging force to urge the regulating member(s).

In this configuration, it is possible to secure the characteristic easily, when changes of initial setting, chronological changes and changes of object specifications are made, by adjusting the urging force to urge the regulating member, holding the object securely in the storage compartment during insertion and holding it in an ejected position by a fixed amount during ejection.

The present invention comprises a connection receiving part to be connected with a connection part provided for the object.

In this configuration, it is possible to securely connect the terminal part and the contact part so that the object can be held securely in the prescribed position of the storage compartment.

The present invention comprises: a connection receiving part to be connected with a connection part provided for the object; and a thickness judging part for detecting the thickness dimension of said object, wherein said connection receiving part and said thickness judging part apply loads in the ejecting direction to said object.

In this configuration, the connection receiving part and thickness judging part are also used as the ejecting means, thereby an appropriate ejecting force for ejecting the object can be easily realized.

The present invention further comprises: a connection receiving part to be connected with a connection part provided for the object; and a thickness judging part for detecting the thickness dimension of said object, wherein said connection receiving part and said thickness judging part apply loads in the direction opposite the ejecting direction to said object.

In this configuration, the connection receiving part and thickness judging part are also used as supplements of the regulating member that generate a load in the direction opposite the direction of ejecting, thereby an appropriate friction resistance load to hold the object without falling can be easily realized.

According to the present invention, the storage compartment comprises an insertion port; an ejection urging means on an end surface opposing said insertion port; and a connection receiving part and a thickness judging part on a surface that cross(es) with said end surface.

In this configuration, the connection receiving part and thickness judging part apply a load to the object in the direction opposite the ejecting direction, thereby it can be easily realized that the connection receiving part and thickness judging part function as supplements of the regulating member that generate a load in the direction opposite the ejecting direction.

The present invention comprises an abutting part with a friction resistance load on a part where the thickness judging part abuts the object.

In this configuration, the thickness judging part applies a load to the object in the direction opposite the ejecting direction, thereby it can be easily realized that the thickness judging part function as supplements of the regulating member that generate a load in the direction opposite the ejecting direction.

According to the present invention, a load in the ejecting direction provided by the ejecting means is set larger than a friction resistance load in the direction opposite the ejecting direction in which the contact part of the regulating member abuts the object, plus a friction resistance load generated by the connection receiving part and thickness judging part in the direction opposite the ejecting direction as well as a load in the direction opposite the ejecting direction due to the mass of said object, and the friction resistance load in the direction opposite the ejecting direction in which the contact part of the regulating member abuts the object, plus a friction resistance load generated by the connection receiving part and thickness judging part in the direction opposite the ejecting direction is set larger than the load in the ejecting direction due to the mass of said object.

In this configuration, by releasing the lock, regardless of the attitude direction of the storage apparatus, the object can be held in a position ejected by a fixed amount.

According to the present invention, the larger the external shape of the object is, the larger the load in the ejecting direction provided by the ejecting means is set.

In this configuration, the object can be ejected with an appropriate ejecting force in accordance with the external shape of the object.

The present invention comprises at least either one of an ejection urging part and a thickness judging part for detecting the thickness dimension of an object inserted into the storage compartment, wherein at least one of these ejection urging part and thickness judging part has a plurality of members disposed along a prescribed direction along which said object dimension varies, and among the members, those that do not abut said object face said object spaced in said prescribed direction in order to regulate the position of said object in said prescribed direction.

In this configuration, in addition to the regulating member, by regulating the position of the object at a plurality of locations, the position of the object is securely regulated, thereby the load is dispersed and the durability can be improved. Also, if the ejection urging part the thickness judging part is equipped with a function for regulating the position of the object, the number of components are reduced and the configuration is simplified, thereby reduction in manufacturing cost and downsizing of the equipment can be realized.

The present invention comprises an ejection urging part and regulating member(s), either of these ejection urging part and regulating member function as a thickness judging part for detecting the thickness dimension of an object inserted into the storage compartment.

In this configuration, since the ejection urging part or the regulating member functions as the thickness judging part in this configuration, the number of components are reduced and the configuration is simplified, thereby reduction in manufacturing cost and downsizing of the equipment can be realized.

The present invention comprises a plurality of regulating members that face the object from a plurality of directions.

In this configuration, the storage apparatus can be formed to be capable of storing the object and regulating the position of the objects having different dimensions in a plurality of directions by the regulating members.

According to the present invention, a fitting part is provided for the object and the storage room, respectively, in order to prevent insertion errors.

In this configuration, correlatively with the position regulating by the regulating part, insertion errors are prevented by the fitting part, and the objects can be maintained to be located in the storage apparatus securely and accurately.

According to the present invention, the object is a battery.

In this configuration, batteries of a plurality of sizes are loaded and unloaded with effective usability, thereby connection can be securely made.

According to the present invention, the object is an IC card.

In this configuration, IC cards of a plurality of sizes are loaded and unloaded with effective usability, thereby connection can be securely made.

The storage apparatus according to the present invention makes it possible to load objects of a plurality of kinds in prescribed positions, to load and unload the objects with excellent usability and provides a device with a simple structure.

DETAILED DESCRIPTION OF THE PREFERRED EMBODIMENT

The first through fourth embodiments of the storage apparatus according to the present invention is described with reference to the drawings.

Figure 1:
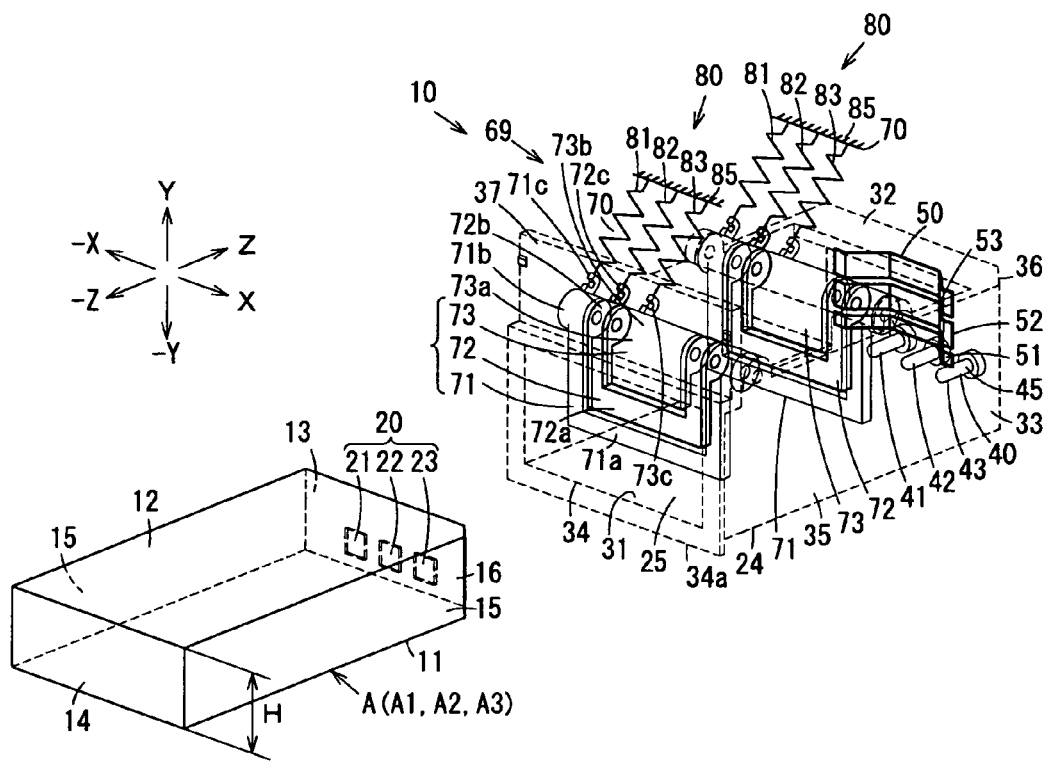
FIG. 1 is a perspective view showing a storage apparatus, which is an embodiment of the present invention, and a battery, which is an object.

Each of the embodiments described here is a storage apparatus 10 for battery A to be used for an apparatus for, for example, a digital still camera, as shown in FIG. 1, wherein the batteries can be nickel hydrogen batteries, alkaline batteries, manganese batteries, lithium batteries, nickel hydrogen batteries and other kinds, while their capacities differ even when they are of the same kind, thus allowing battery A of different shapes to used to supply power to the device.

In the descriptions of the following embodiments, for the sake of simplification of descriptions, the box type battery A, which is the object, is represented by the first through third batteries A1, A2, and A3. Each of these three kinds of battery A is substantially rectangular solid shaped, and with a reference part, an opposing surface 12 which is opposite reference surface 11 and is a position regulating surface, a distal surface 13, a proximal surface 14, which is opposite distal surface 13, and both side surfaces 15 and 15. Battery A is shown in the drawing as a substantially rectangular solid shape, and except for a notched part 16 provided at a corner of the negative side of distal surface 13, the external shape that prevents insertion errors by fitting into a receiving shape provided for storage apparatus 10 is omitted in the drawing. While batteries A1, A2 and A3 differ in thickness H as H1, H2 and H3 (H1<H2<H3) as well as in the mass as W1, W2 and W3 (W1<W2<W3), three terminals 21, 22 and 23 of terminal part 20 provided at distal surface 13 are formed in the same shape and at the same location with respect to reference surface 11.

Storage apparatus 10 provided for a portable equipment such as a digital still camera can be used in an attitude direction, but it is assumed that the −Y side, which is the reference side, is the lower side, and the Y side is the upper side, with the Y/−Y direction being the vertical direction and the thickness direction of battery A as shown by the coordinates (X, Y, Z) in FIG. 1. Similarly, the −X/X direction will be described as the horizontal direction and the width direction of battery A. Moreover, the description assumes the Z direction being the battery A's insertion direction, and the −Z direction being the ejecting (unloading) direction of battery A, with the −Z/Z direction being the longitudinal direction and the lengthwise direction of battery A.

Storage apparatus 10 is equipped with a device main body 24 formed with synthetic resin and the like in a substantially box-like shape, a storage compartment 25 is formed inside device main body 24 for inserting three kinds of batteries A1, A2 and A3 having thicknesses H1, H2 and H3 respectively. Storage compartment 25 consists of a bottom part 31, which is a reference receiving part, a ceiling part 32 that confronts bottom part 31, an end surface 33 at the back side, an insertion port 34 that confronts end surface 33 and opens its mouth in a rectangular solid shape for battery insertion, and two side surfaces 35 and 35. Although storage compartment 25 of the storage apparatus 10 is also formed to fit battery A in a manner to prevent insertion errors, this is omitted in the drawing except for reception shape 36 that abuts with notched part 16 formed at the corner of end surface 33 at the back side and the negative side of the side surface 35. A substantially vertical wall 37 is provided surrounding insertion port 34.

Figure 4:
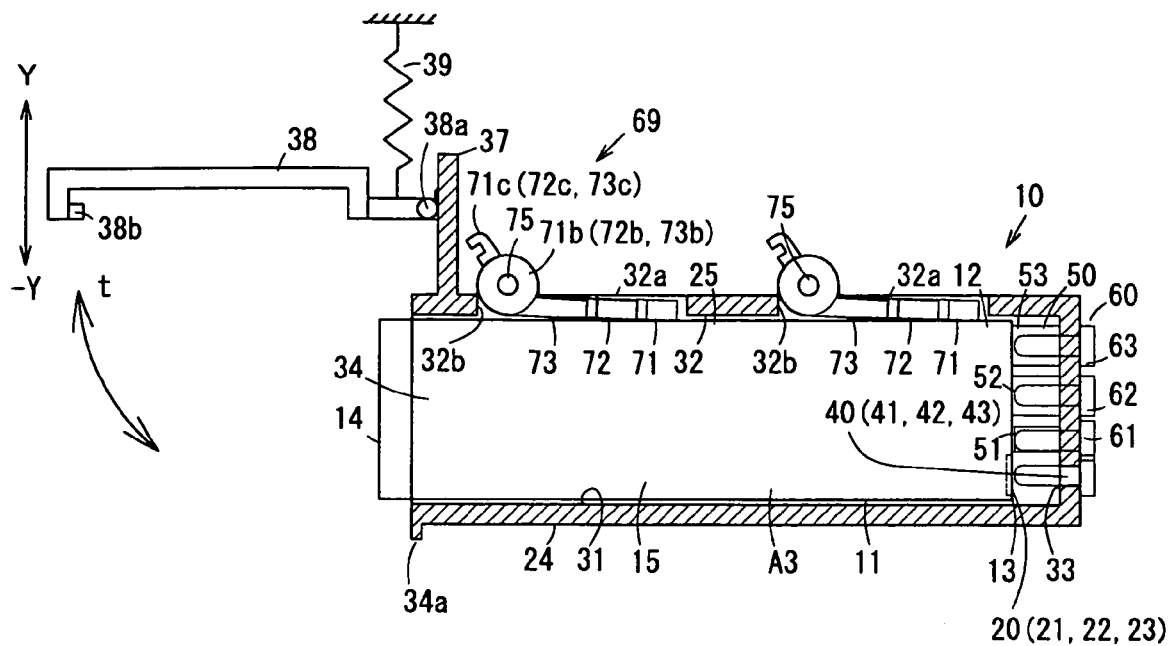
FIG. 4 is a cross section of said storage apparatus where the third battery is inserted with the lid open.

This insertion port 34 is also covered by a lid body 38 that is capable of insertion port and closing, forming a lid that functions as a locking means, whose locking when the battery is loaded, and unlocking operations are provided while insertion port and closing the lid body 38. Lid body 38 is supported by device main body 24 in a manner to be able to slide slightly in a vertical direction as well as to rotate around a horizontal axis 38a. In other words, axis 38a is supported between wall 37, which is protrudingly provided above insertion port 34 of device main body 24, and a supporting member (not shown) in a vertically movable manner. A hook part 38b is provided at the lower end of the lid body 38 and can be engaged or disengaged with a hook receiving part 34a provided beneath insertion port 34 of device main body 24. Moreover, a lid spring 39, which is an urging means, is connected to lid body 38 as shown in FIG. 4, urging lid body 38 in the direction of insertion port lid body 38 (−Z direction), and also in the direction (Y direction) in which hook part 38b is engaged with hook receiving part 34a. In other words, if hook part 38b is not engaged with hook receiving part 34a, lid body 38 rotates in the clockwise direction t by the urging force of the lid spring 39 as shown in FIG. 4, and is further held in a position more than 90 degrees open relative to the plane that consists of insertion port 34 by the urging force of the lift spring 39 to allow battery A to be inserted.

A contact point part 40, which is a connection receiving part that corresponds to terminal part 20 of the loaded battery A, is provided at end surface 33 at the back side. Contact part 40 is provided with first through third contact points 41, 42 and 43 to be electrically connected to terminals 21, 22 and 23, respectively, of battery A loaded at a prescribed position. Each contact point 41, 42 and 43 is provided with a contact pin 45 that is shaped like a pin and retractably protrudes into storage compartment 25 and a spring 46, which is an urging means for each contact pin 45 into storage compartment 25, and contact point part 40 consists of an ejecting means in this embodiment. Contact points 41, 42 and 43 are connected to the power unit of the device through wires not shown.

The first embodiment can have three kinds of batteries A1, A2 and A3 in the prescribed positions of the storage compartment 25 of FIG. 3 as shown in FIG. 1 through FIG. 4, and can securely maintain the condition of having the batteries loaded in the prescribed positions, and can eject respective batteries A1, A2 and A3 a fixed amount from insertion port 34 of the storage compartment 25 in case of their unloading.

Figure 3A:
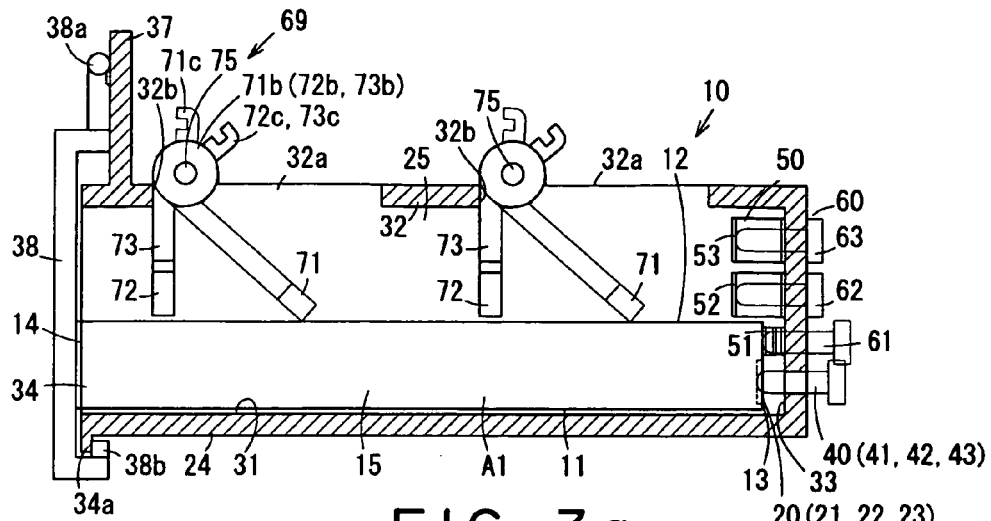
FIG. 3 is a cross sectional view showing a condition of said storage apparatus storing the battery, showing the conditions of inserting (a) first battery A1, (b) second battery A2, and (c) third battery A3 respectively.

An ejection urging part 50 which consists of an ejecting means, in addition to contact point part 40, is provided on end surface 33 at the back side of the storage compartment 25. This ejection urging part 50 is for ejecting the stored battery A for a fixed amount from storage compartment 25, and is equipped with three ejection springs 51, 52 and 53 which are the urging means with respect to the batteries A1, A2 and A3. These ejection springs 51, 52 and 53 are leaf springs, that is, elastic deformation members, aligned in a vertical direction and disposed on end surface 33 of the storage compartment 25 in order to provide prescribed urging forces in correspondence with a plurality of batteries A1, A2 and A3 of different shapes. More specifically, they are arranged in a manner that only the first ejection spring 51 abuts the first battery A1, the first ejection spring 51 and the second ejection spring 52 abut the second battery A2, and the first through third ejection springs 51, 52 and 53 abut the third battery A3, wherein their urging forces (elastic deforming loads) urge each battery A1, A2 or A3 loaded in storage compartment 25 to be ejected for a fixed amount from insertion port 34. Moreover, as shown in FIG. 3(a) and (b), the lower edge of each ejection spring 51, 52 or 53 protrudes upward of the battery A, which is not urged; in other words, second ejection spring 52 regulates the position of opposing surface 12, which is the upper surface of the first battery A1, and third ejection spring 53 regulates the position of opposing surface 12, which is the upper surface of the second battery A2, so that the positions of the batteries can be regulated between the springs and bottom surface part 31 of the storage compartment 25. It is configured so that the greater the thickness dimensions H1, H2 and H3 of respective batteries A1, A2 and A3 are, the greater the ejecting force by means of ejecting part 50 is, that is, the greater the combined urging force obtained by combining the loads F51, F52 and F53 of first through third ejection springs 51, 52 and 53, wherein load F50 for first battery A1 is F51, load F50 for second battery A2 is F51+F52, and load F50 for third battery A3 is F51+F52+F53, and further satisfy Conditional Expression 1 or 1-1.

Figure 2:
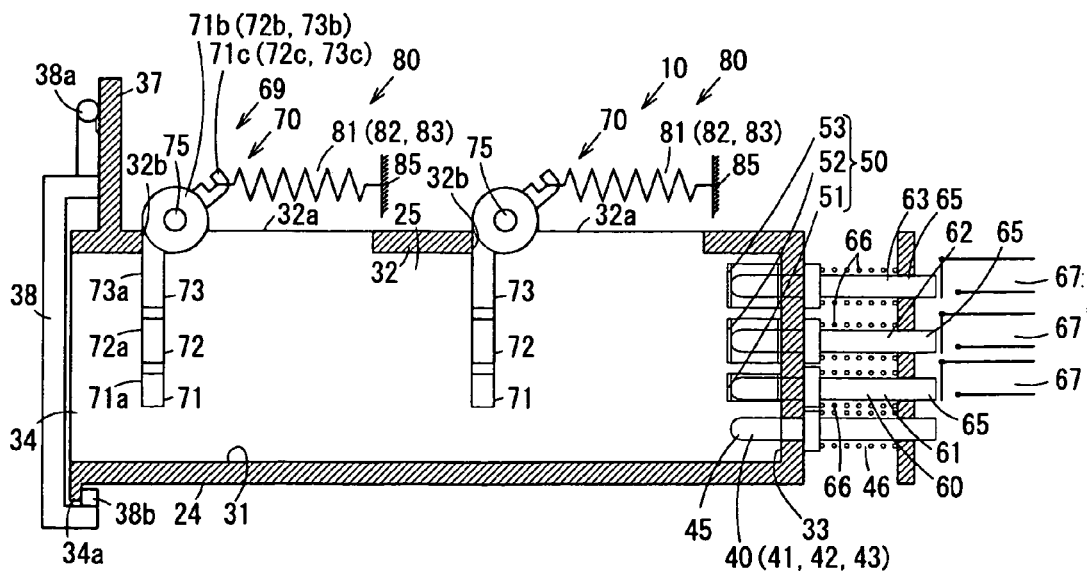
FIG. 2 is a cross sectional view of said storage apparatus without storing the battery.

A thickness judging part 60 is provided on end surface 33 at the back side of the storage compartment 25 as shown in FIG. 2. Thickness judging part 60 is for judging each battery A based on its thickness dimension and is equipped with first through third thickness judgment switches 61, 62 and 63. Each thickness judgment switch 61, 62 and 63 is equipped with an action pin 65, a spring 66 which is an urging means, and a switch main body 67 connected to a control means (not shown), wherein each action pin 65 is urged by spring 66 to protrude for a fixed amount into storage compartment 25, so that thickness judging part 60 also consists of the ejecting means as well in this embodiment. When a battery A1, A2 or A3 is loaded, the action pin(s) 65 is/are pressed in accordance with the thickness dimensions H1, H2 and H3 of respective batteries A1, A2 and A3, and switch main bodies 67 are turned on respectively. In this embodiment, thickness judgment switches 61, 62 and 63 are placed at the back of ejection springs 51, 52 and 53, respectively, so that respective action pins 65 are pressed vian ejection springs 51, 52 and 53, respectively.

An opening 32a is formed on ceiling part 32 of device main body 24 in the insertion direction of battery A, and a position regulating part 69 is provided at the location of opening 32a as a means of regulating the thickness direction, that is, movement in the vertical direction of battery A. Position regulating part 69 is provided in a plurality of locations, or two locations, front and back, in this embodiment along the direction of battery A insertion, each having a position regulating plate part 70. A plurality of, in particular, first through third in this embodiment, position regulating plates 71, 72 and 73 is provided rotatably for each position regulating plate part 70 in accordance with a variety of types of battery A. Position regulating plates 71, 72 and 73 are equipped, respectively, with plate-shaped regulating plate main bodies 71a, 72a and 73a, cylindrical bearing parts 71b, 72b and 73b provided on one end of regulating plate main bodies 71a, 72a and 73a, and latching parts 71c, 72c and 73c, which are further protrudingly provided from these bearings 71b, 72b and 73b are connection parts of the urging means, so that bearing parts 71b, 72b and 73b are supported rotatably concentric with a axis part 75 with both side directions as axial directions. And, respective regulating plate main bodies 71a, 72a and 73a are each formed line symmetric around the centerline of the width direction, first regulating plate main body 71a being formed in an open ended rectangular solid shape wherein the ends of the parts protrudingly provided from the vicinities of both ends of axis part 75 are connected, second regulating plate main body 72a being formed in an open ended rectangular solid shape along the insides of the first regulating plate main body 71a, and third regulating plate main body 73a being formed in a rectangular solid shape surrounded by second regulating plate main body 72a. Regulating plate main bodies 71a, 72a and 73a can rotate from a condition in a protruding direction towards storage compartment 25 abutting a stop part 32b formed on the edge of opening 32a of device main body 24 to a position to be substantially horizontal stored in opening 32a.

Position regulating plates 71, 72 and 73 are urged by regulating springs 81, 82 and 83 respectively, which are the urging means that consist of a position regulating urging part 80. In other words, regulating springs 81, 82 and 83 are connected to position regulating plates 71, 72 and 73 by being locked with hooking parts 71c, 72c and 73c on of the one ends, while connected to device main body 24 by being locked to a fixed part 85 on the other ends. On account of the urging forces of these regulating springs 81, 82 and 83, positioning regulating plates 71, 72 and 73 are locked in a condition wherein regulating plate main bodies 71a, 72a and 73a are urged in the direction of protruding into storage compartment 25 (in the clockwise direction in FIG. 2 and FIG. 3), while respective regulating plate main bodies 71a, 72a and 73a are urged in the direction of protruding substantially perpendicular to storage compartment 25 and locked by abutting stop 32b when no other forces are applied.

Also, under this condition, the distal end of the first regulating plate main body 71a is at approximately the same height as the lower edge of the first eject spring 51, the distal end of the second regulating plate main body 72a is at approximately the same height as the lower edge of the second eject spring 52, and the distal end of third regulating plate main body 73a is at approximately the same height as the lower edge of third eject spring 53. In other words, second regulating plate main body 72a protrudes further into storage compartment 25 than third regulating plate main body 73a, and first regulating plate main body 71a protrudes even further into storage compartment 25.

And respective positioning regulating plates 71, 72 and 73 of the position regulating plate part 70, urged by regulating springs 81, 82 and 83, are pressed against the opposing surfaces of the inserted battery A to generate friction resistance loads F71, F72 and F73 with respect to battery A which tend to move. Only first position regulating plate 71 is pressed against first battery A1 as it is loaded in the prescribed location, only first position regulating plate 71 and first and second position regulating plate 71 and 72 are pressed against second battery A2 which is loaded in the prescribed location, while first, second and third position regulating plates 71, 72 and 73 are pressed against third battery A3 which is loaded in the prescribed position. Thus, it is set in a manner that the thicker the thickness dimensions H1, H2 and H3 of batteries A1, A2 and A3 are, the larger the friction resistance load F70 of the positioning regulating plate 70 is, that is, the combined load of loads F71, F72 and F73 of the first, second and third position regulating plates 71, 72 and 73 becomes large. In other words, load F70 is F71 for first battery A1, load F70 for second battery A2 is F71+F72, and load F70 for third battery A3 is F71+F72+F3. In addition, this friction resistance load F70 of the position regulating plate part 70 remains the same in the load (F101) for a contact part 101 provided for each position regulating plate 71, 72 and 73 in the second embodiment described later.

Next, the operation for loading battery A into storage apparatus 10 is described.

First, the operation of insertion port lid body 38 is described.

As shown in FIG. 2, lid body 38 is in a closed condition as lid body 38 is urged upward (Y direction) by means of the lid spring 39 shown in FIG. 4 to cause hook part 38b to be engaged with hook receiving part 34a.

At this point, the operator slides lid body 38 downward (−Y direction) opposing the urging force of the lid spring 39 in order to disengage hook part 38b from hook receiving part 34a. As the operator releases a grip on the lid body 38, it rotates in the direction for insertion port the insertion port 34 (clockwise direction in FIG. 2 and FIG. 4) due to the urging force of the lid spring 39, and further rotates more than 90° due to the urging force of the lid spring 39 to maintain insertion port 34 in an open condition, thus making it possible to insert battery A.

Next, with reference to FIG. 3(a), the operation of loading first battery A1 having the smallest thickness is described.

As first battery A1 is inserted through insertion port 34 opened as shown in the above-described drawing in the prescribed direction of insertion (Z direction), distal surface 13 of the first battery A1 first reaches position regulating plate part 70 on the side closer to insertion port 34. At this time, three position regulating plates 71, 72 and 73 that consist of the position regulating plate part 70 are abutting stop part 32b and in an urged and locked condition respectively. When first battery A1 is further inserted, distal surface 13 of the first battery A1 abuts one to three of the three position regulating plates 71, 72 or 73, and these position regulating plates 71, 72 or 73 rotate rear and upward (counterclockwise direction of FIG. 3) opposing the urging forces of regulating springs 81, 82 and 83. When first battery A1 is further inserted and either one of position regulating plates 71, 72 and 73 abuts the upper edge (crossline between distal surface 13 and opposing surface 12) of distal surface 13 of the first battery A1, additionally, on opposing surface 12, which is the upper surface of the first battery A1, position regulating plates 71, 72 and 73 guide first battery A1 pressed downward by the urging forces of regulating springs 81, 82 and 83 to cause it to be pressed against bottom surface part 31, which is the reference surface of the storage compartment 25. In a condition where reference surface 11 of the first battery A1 is pressed against bottom surface part 31 of the storage compartment 25, only first position regulating plate 71, which has the largest protrusion dimension, is pressed against first battery A1, while second and third position regulating plates 72 and 73, whose protrusion dimensions are smaller than that of the first position regulating plate 71, are not abutting first battery A1, thus maintaining a condition where it is urged and engaged on the protruded initial position perpendicular to the inside of the storage compartment 25 by urging forces of regulating springs 82 and 83. When first battery A1 is further pressed in, the second position regulating plate part 70 acts in the same manner and guides first battery A1. In this condition, first battery A1 is held pressed against bottom surface part 31 of the storage compartment 25 by two position regulating plates 71, while second position regulating plate 72 vertically faces opposing surface 12 of the first battery A1 to regulate the position of the first battery A1. When first battery A1 is further pressed in, distal surface 13 of the first battery A1 abuts one ejection spring 51 and one thickness judging switch 61, so that it is identified as first battery A1 by the control means, while contact points 41, 42 and 43 abuts respective terminals 21, 22 and 23.

Figure 3B:
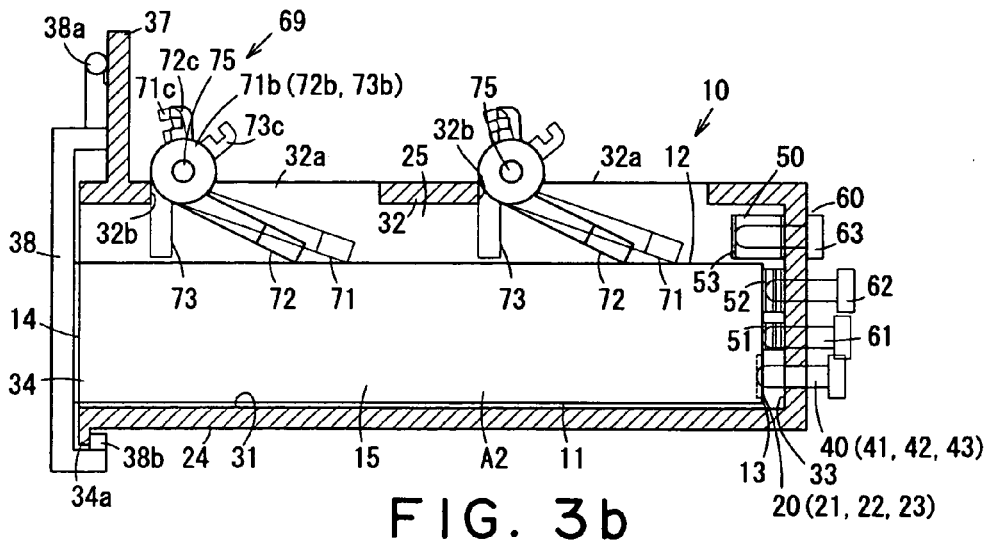

The operation of loading second battery A2 shown in FIG. 3(b) is conducted in a condition where second battery A2 is inserted into storage compartment 25 in a prescribed insertion direction (Z direction) through insertion port 34, similar to the case of the first battery A1 as described above, while lid body 38 is opened as shown in FIG. 4 until distal surface 13 of the second battery A2 reaches first position regulating plate part 70. Then, distal surface 13 of the second battery A2 abuts two (71 and 72) to three (71, 72 and 73) of three position regulating plates 71, 72 and 73 to cause these position regulating plates 71, 72 and 73 to rotate rear upward (counterclockwise of FIG. 3) opposing the urging forces of regulating springs 81, 82 and 83. When second battery A2 is further inserted and either one of position regulating plates 71, 72 and 73 abuts the upper edge (crossline between distal surface 13 and opposing surface 12) of distal surface 13 of the second battery A2, and on opposing surface 12, which is the upper surface of the second battery A2, these position regulating plates 71, 72 and 73 guide second battery A2 to press downward by the urging forces of regulating springs 81, 82 and 83, accordingly, first and second position regulating plates 71 and 72 press second battery A2 downward, causing reference surface 11 of the second battery A2 to be pressed against bottom surface part 31, which is the reference surface of the storage compartment 25. And, in a condition where reference surface 11 of the second battery A2 is pressed against bottom surface part 31 of the storage compartment 25, only first position regulating plate 71 and second position regulating plate 72 are pressed against second battery A2, while third position regulating plates 73, whose protrusion dimension is smaller than those of first and second position regulating plate 71 and 72, is not abutting second battery A2 across a space, thus maintaining a condition where it is urged and engaged at the protruded initial position perpendicular to the inside of the storage compartment 25 by urging forces of regulating springs 83. When second battery A2 is further pressed in, the second position regulating plate part 70 acts in the same manner and guides second battery A2. Thus, second battery A2 is held in a condition being pressed down to bottom surface part 31 of the storage compartment 25 by four position regulating plates 71, 71, 72 and 72, further third position regulating plate 73 vertically faces opposing surface 12 of the second battery A2 regulating the position of the second battery A2. When second battery A2 is further pressed in, distal surface 13 of the second battery A2 abuts two ejection springs 51 and 52 as well as two thickness judging switches 61 and 62, so that it is identified as second battery A2 by the control means, while contact points 41, 42 and 43 abuts terminals 21, 22 and 23.

Figure 3C:
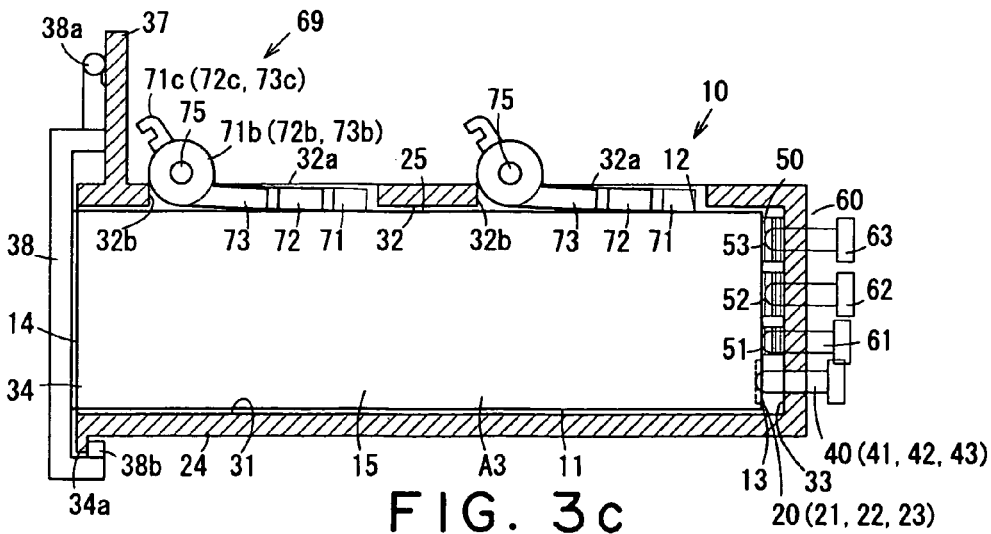

The operation of loading third battery A3 shown in FIG. 3(c) is carried out in a manner that third battery A3 is inserted into storage compartment 25 in a prescribed direction (Z direction) through insertion port 34, similar to the case of the first battery A1 as described above, while lid body 38 is opened as shown in FIG. 4 until distal surface 13 of third battery A3 reaches first position regulating plate part 70. Then, distal surface 13 of third battery A3 abuts all of the three position regulating plates 71, 72 and 73 to cause these position regulating plates 71, 72 and 73 to rotate rear upward (counterclockwise of FIG. 3) opposing the urging forces of regulating springs 81, 82 and 83. When third battery A3 is inserted and position regulating plates 71, 72 and 73 abut the upper edge (crossline between distal surface 13 and opposing surface 12) of distal surface 13 of third battery A3, and on opposing surface 12, which is the upper surface of third battery A3, position regulating plates 71, 72 and 73 guide third battery A3 to press downward by the urging forces of regulating springs 81, 82 and 83 to cause third battery A3 to be pressed downward, causing reference surface 11 of third battery A3 to be pressed against bottom surface part 31, which is the reference surface of the storage compartment 25. Herein, the cross-sectional shape of the storage compartment 25, that is, the vertical dimension of insertion port 34 in the vertical direction, is made slightly larger than the thickness H3 of third battery A3, so that the battery's position is regulated by the top and bottom surfaces of the storage compartment 25. When third battery A3 is further pressed in, distal surface 13 of third battery A3 abuts three ejection springs 51, 52 and 53 as well as three thickness judging switches 61, 62 and 63, so that it is identified as third battery A3 by the control means, while contact points 41, 42 and 43 abuts respective terminals 21, 22 and 23.

Here, relationship of operations for insertion of batteries A1, A2 and A3 and position regulating plates 70 and 70 provided at two locations are described.

As shown in FIG. 3(a), each battery A is guided by position regulating plate parts 70 and 70 provided at two locations in this embodiment, so that the combined pressing force applied by two first position regulating plates 71 and 71 of position regulating plate parts 70 and 70 at the two locations is set to be slightly larger than the capacity required to support the weight W1 of the first battery A1. It is preferable that the combined pressing force is designed not only to be slightly larger than the capacity to support the weight WA of battery A, but also the pressing force of the position regulating plate at each of position regulating plate parts 70 and 70 is slightly larger than the force to support the weight WA of battery A. For example, as for first battery A1, it is preferable for each of the first position regulating plates 71 and 71 of the position regulating plate parts 70 and 70 to be designed to have a capacity slightly larger than the capacity required to support the weight W1 of the first battery A1.

In a similar manner, since the pressure against second battery A2 is applied by the pressing forces of first and second position regulating plates 71 and 72 as shown in FIG. 2(b), it is set that at least the combined pressing forces of both position regulating plate parts 70 and 70 which are provided at least two locations is slightly larger than the force required to support the weight W2 of the second battery A2; however, it is preferable to set in a condition where first and second position regulating plates 71 and 72 of one of the position regulating plate parts 70 alone can have a force slightly larger than the force required to support the weight W2 of the second battery A2 and that first and second position regulating plates 71 and 72 of the other one of the two position regulating plate parts 70 alone can have a force slightly larger than the force required to support the weight W2 of the second battery A2.

In a similar manner, since the pressure to third battery A3 is applied by the pressing forces of first through third position regulating plates 71, 72 and 73 as shown in FIG. 2(c), it is set in a condition where at least the combined pressing forces of position regulating plate parts 70 and 70 which are provided at least two locations is slightly larger than the force required to support the weight W3 of third battery A3; however, it is preferable to set in a condition where first through third position regulating plates 71, 72 and 73 of one of the two position regulating plate parts 70 alone can have a force slightly larger than the force required to support the weight W3 of third battery A3 and also that first through third position regulating plates 71, 72 and 73 of the other one of the position regulating plate parts 70 alone can have a force slightly larger that the force required to support the weight W3 of third battery A3.

And, according to these force relationships, the lower surfaces which are a reference surface 11 of respective batteries A1, A2 and A3 can be pressed against the bottom surface part 31 which is a reference surface of the storage compartment 25 so as to position, regardless of the attitude of the storage apparatus 10.

In addition, in the configuration of this first embodiment, respective batteries A1, A2 and A3 falling out from insertion port 34 can be taken out when batteries A1, A2 and A3 are in an attitude of the gravity fall direction, that is, when insertion port 34 is facing downward, so that storage apparatus 10 should be in an attitude direction that does not cause battery A to free fall when inserting battery A.

Next, the locking operation that loads and retains batteries A1, A2 and A3 in storage compartment 25 is described.

In addition, in FIG. 4, a condition where a third battery A3 is inserted in storage compartment 25 and third battery A3 is abutting ejection springs 51, 52 and 53, contact points 41, 42 and 43, and thickness judgment switches 61, 62 and 63 is shown, however, a similar condition occurs for first and second batteries A1 and A2 except that the abutting of said components and abutting relationships of position regulating plates 71, 72 and 73 are different, so that it will be explained for battery A in general. Also, the condition shown in FIG. 4 indicates the same condition that, when battery A is loaded into storage compartment 25 and lid body 38 is opened, battery A is ejected from storage compartment 25 with a fixed amount.

First, battery A is inserted in a condition shown in FIG. 4 and then the inserting action is halted by releasing a grip on the battery. Now, while it is in this battery insertion condition, lid body 38 is rotated in a direction to close insertion port 34 (counterclockwise direction in FIG. 4) against the urging force of the lid spring 39. Then, lid body 38 abuts proximal surface 14 of battery A and starts to push battery A into storage compartment 25. It then presses battery A further until it becomes flush with the surface of insertion port 34 of the storage compartment 25 against the load of respective ejection springs 51, 52 and 53, spring 46 of contact points 41, 42 and 43, and springs 66 of thickness judging switches 61, 62 and 63 corresponding with distal surface 13 of batteries A1, A2 and A3. Next, lid body 38 is further pressed in the insertion direction in a condition where the lid body 38 is slid downward (−Y direction) against the urging force of the lid spring 39, and set to the lock release position, then, the lid body is slid upward (Y direction) in the opposite direction, when hook part 38b and hook receiving part 34a are engaged and a grip is released, and by the urging force of the lid spring 39, as shown in FIG. 2, hook part 38b and hook receiving part 34a are maintained in an engaged condition, and battery A is held in a prescribed position of the storage compartment 25 to complete the operation for loading battery A in storage apparatus 10.

And, this locking operation to load and hold battery A in storage compartment 25 functions similar to first and second batteries A1 and A2 (not shown), locks to close lid body 38, however, the elements that apply loads to first battery A1 by abutting distal surface 13 consist of the spring 46 of springs of contact points 41, 42 and 43, as well as first ejection spring 51 corresponding to first battery A1 and spring 66 of the first thickness judging switch 61, and the elements that apply loads to second battery A2 by abutting distal surface 13 consist of the spring 46 of springs of contact points 41, 42 and 43, first and second ejection springs 51 and 52 corresponding to second battery A2 and springs 66 of first and second thickness judging switches 61 and 62, so that the loads acting in the ejecting direction vary with the thickness dimensions H1, H2 and H3 of batteries A1, A2 and A3.

With lid body 38 being closed, battery A is held in the prescribed position where reference surface 11 of battery A makes close contact with bottom surface part 31, which is a reference surface of the storage compartment 25, and where contact points 41, 42 and 43 are electrically connected with terminals 21, 22 and 23 of battery A by being slightly pressed into them. Under this condition, acting pins 65 of corresponding thickness judging switches 61, 62 and 63 are pressed in firmly to turn on switch main body 67 thus allowing the control means to detect the thickness.

And, first and second batteries A1 and A2 are pressed against bottom surface part 31 of the storage compartment 25 by the urging force of one or two position regulating plates 71 and 72 of position regulating plate parts 70 and 70 located at two positions. Position regulating plates 72 and 73, which are not involved in urging batteries A1 and A2, are urged by positioning springs 82 and 83, and locked in to abut stop part 32b perpendicular to batteries A1 and A2 from axis part 75, so that regulating springs 81, 82 and 83 will not be subjected to excessive loads and respective batteries A1 and A2 are held in a condition where it is pressed against bottom surface part 31 of the storage compartment 25, even when an impact force is applied to storage apparatus 10 or when an acceleration is applied to battery A and respective batteries A1 and A2 are pressed against position regulating plates 72 and 73.

Moreover, concerning first and second batteries A1 and A2, by ejection springs 52 and 53, the position regulating of batteries A1 and A2 in the thickness direction is carried out.

As shown in FIG. 3(a), concerning first battery A1 as it is loaded in storage compartment 25, first ejection spring 51 is compressed in the insertion direction in a condition where the first ejection spring is in close proximity to end surface 33 at the back side of the storage compartment 25 by first battery A1, while second ejection spring 52 is located a prescribed space upward from opposing surface 12 of the first battery A1 so that it is in a protruding condition at the upper side of the first battery A1. Second ejection spring 52, which is made of a metal plate spring, deforms elastically in the insertion direction, however, hardly deforms elastically in the vertical direction, that is, in the width direction of the metal plate, providing rigidity to oppose the weight of battery A. Therefore, it serves as a position regulating means as well to firmly regulate the position of the first battery A1 as the lower edge of the second ejection spring 52 abuts opposing surface 12 of the first battery A1.

As shown in FIG. 3(b), concerning second battery A2 as it is loaded in storage compartment 25, first and second ejection springs 51 and 52 are compressed in the insertion direction in a condition where they are in close proximity to end surface 33 at the back side of the storage compartment 25 by second battery A2, while third ejection spring 53 is located a prescribed space upward from opposing surface 12 of the second battery A2 so that it is in a protruding condition at the upper side of the second battery A2. Also, third ejection spring 53, which is made of a metal plate spring, deforms elastically in the insertion direction, however, hardly deforms elastically in the vertical direction, that is, in the width direction of the metal plate, providing rigidity to oppose the weight of battery A. Therefore, it serves as a position regulating means as well to firmly regulate the position of the second battery A2 as the lower edge of third ejection spring 53 abuts opposing surface 12 of the second battery A2.

Accordingly, position regulating is carried out by the ejection springs 52 and 53 in addition to position regulating in the position regulating plates 72 and 73, battery A is regulated in plural locations, consequently, impact force is applied to storage apparatus 10 or the loads generated are dispersed when acceleration is applied to battery A, thus the strength and durability of respective components are easily improved.

As for third battery A3, the entire shape of the storage compartment regulates the position of third battery A3 while position regulating plates 71, 72 and 73 of position regulating plate parts 70 and 70 located at two positions elastically press it and support it stably.

In addition, when lid body 38 is closed without battery A stored in storage compartment 25, the only difference from the above description is that no load occurs in closing lid body 38 for pressing in battery A. In other words, with battery A unloaded, lid body 38 is rotated in the direction to close insertion port 34 (counterclockwise direction in FIG. 4) against the urging force of the lid spring 39so that it abuts the periphery of insertion port 34. Next, lid body 38 is further pressed in the insertion direction in a condition where the lid body 38 is slid downward (−Y direction) against the urging force of the lid spring 39, and set to the lock release position, then, the lid body is slid upward (Y direction) is slid which is in the opposite direction, when hook part 38b and hook receiving part 34a are engaged and a grip is released, and by the urging force of the lid spring 39, as shown in FIG. 2, hook part 38 band hook receiving part 34a are maintained in an engaged condition, thus completing the operation for closing lid body 38.

Next, the operation for unloading battery A is described.

First, the operation for unloading the first battery A1 is described.

The operation of insertion port lid body 38 is the same as the operation for insertion port lid body 38 when battery A is not loaded; starting from the condition in which first battery A1 is loaded as shown in FIG. 3(a), spring 39 is slid downward (−Y direction) against the urging force of the lid spring 39 in order to release engagement between hook part 38b and hook receiving part 34a. As the operator releases a grip on the lid body 38, it rotates in the direction for insertion port the insertion port 34 (clockwise direction "t" in FIG. 2 and FIG. 4) due to the urging force of the lid spring 39, and rotates more than 90° due to the urging force of the lid spring 39 to maintain insertion port 34 in an open condition, thus making it possible to insert battery A.

Accordingly, inserted first battery A1, as described later, against the mass W1 of the first battery A1 and friction resistance load F71 of the position regulating plate 71 of the position regulating plate part 70 is ejected to an abutting position shown in FIG. 4 by an appropriate ejecting load the combination of which is the ejecting load F51 of the first ejection spring 51, contact point part 40, that is, ejecting load F40 of contact points 41, 42 and 43, and ejecting load F61 (=F60) of the first thickness judging switch 61 of thickness judging part 60. The operator can then take out first battery A1 from storage compartment 25 by gripping a part of the first battery A1 which is protruding out of the storage compartment 25.

The operation for unloading second battery A2 is similar to that for unloading first battery A1 except that differs from the operation of unloading first battery A1 in the fact that second battery A2 is ejected against the combined mass W2 of the second battery A2 and friction resistance load F71+F72 of position regulating plates 71 and 72 of the position regulating plate part 70 by means of a larger, appropriate ejecting load (ejecting force), which is the combined ejecting load F51+F52 of first and second ejection springs 51 and 52, contact point part 40, that is, ejecting load F40 of respective contact points 41, 42 and 43, and ejecting load F61+F62 (=F60) of first and second thickness judging switches 61 and 62 of thickness judging part 60.

Moreover, the operation for unloading third battery A3 is similar to that of unloading first battery A1 except that it differs from the operation for unloading first and second battery A1 and A2 in the fact that third battery A3 corresponding to the combined mass W3 of third battery A3 and friction resistance load F71+F72+F73 of position regulating plates 71, 72 and 73 of the position regulating plate part 70 by a larger, appropriate ejecting load (ejecting force), which is the combined ejecting load F51+F52+F53 of first through third ejection springs 51, 52 and 53, contact point part 40, that is, ejecting load F40 of contact points 41, 42 and 43, and ejecting load F61+F62+F63 (=F60) of first through third thickness judging switches 61, 62 and 63 of thickness judging part 60.

The ejecting load for unloading operation of battery A is explained using the general Conditional expression, where WA is the mass of battery A, F70 is the friction resistance load of the position regulating plate part 70 corresponding to respective batteries A1, A2 and A3, F50 is the load of ejection urging part 50, F40 is the load of the contact point part 40, and F60 is the load of thickness judging part 60:

$$F50+(F40+F60)>(F70+WA) \quad \text{(Conditional expression 1)}$$

Satisfying the above Conditional expressions, the combined ejecting load provides the capability of ejecting battery A to a position that makes it easy for the operator to take it out regardless of the attitude of the storage apparatus 10, for example, the attitude of battery A of the gravity force, that is, where insertion port 34 is facing upward.

Moreover, if the following Conditional expression is satisfied:

$$F50>(F70+WA) \quad \text{(Conditional expression 1-1)}$$

battery A can be ejected by the load of the ejection springs of ejecting urging part 50 alone.

In this manner, storage apparatus 10 has an ejecting force that corresponds to masses W1, W2 and W3 of respective batteries A1, A2 and A3, in all the attitude directions of the storage apparatus 10, respective batteries A1, A2 and A3 from insertion port 34 of the storage compartment 25 are ejected for a fixed amount so that battery A can be taken out with effective usability.

In this manner, according to storage apparatus 10 of this embodiment, respective batteries A1, A2 and A3 are inserted in storage compartment 25 from the insertion port 34 to open lid body 38, and close the lid body 38 again. These simple operations make batteries A1, A2 and A3 which have different shapes from each other stored into prescribed positions and securely connect with contact points 41, 42 and 43 with terminals 21, 22 and 23 of these batteries A1, A2 and A3. As a result, usability can be improved.

In other words, respective batteries A1, A2 and A3 which have different thicknesses from each other, are inserted in storage compartment 25 from the insertion port 34 to open lid body 38, abut position regulating plates 71, 72 and 73 of the position regulating plate part 70 rotatably provided in storage compartment 25 protruding in the thickness direction, and are guided to be moved to the other side by position regulating plates 71, 72 and 73 so as to abut bottom surface part 31 of the storage compartment 25 can be positioned in the vertical direction.

During this loading operation, since position regulating plate part 70 is set so that position regulating plates 71, 72 and 73 are provided corresponding to respective batteries A1, A2 and A3, the greater the thickness H1, H2 and H3 of respective batteries A1, A2 and A3, the greater the pressing forces of the position regulating plates 71, 72 and 73 urged by regulating springs 81, 82 and 83 are provided, so that respective batteries A1, A2 and A3 can be securely pressed with appropriate pressure, on bottom surface part 31 of the storage compartment 25.

Moreover, in a condition where respective batteries A1, A2 and A3 are loaded in prescribed positions, position regulating plates 72 and 73 without urging batteries A1 and A2 are held in positions substantially perpendicular to opposing surfaces 12 of batteries A1 and A2, wherein position regulating plates 72 and 73 leaving small clearances between their distal end and opposing surfaces 12 of batteries A1 and A2, thus allowing position regulating plates 72 and 73 to function as a means of preventing batteries A1 and A2 from moving in the direction of thickness of batteries A1 and A2, so that no excessive load will be applied to regulating springs 81, 82 and 83 and respective batteries A1, A2 and A3 will be held in position, pressed against bottom surface part 31 of the storage compartment 25, even when an impact force applies to storage apparatus 10 or acceleration is applied to battery A.

Similarly, since ejection springs 52 and 53 that do not abut respective batteries A1, A2 and A3 in the direction of their elastic deformations function as position regulating means for preventing movement in the thickness direction, external forces are dispersed in multiple locations, thus durability of the device can be improved.

In this manner, since position regulating plates 72 and 73, ejection springs 52 and 53 carry out the position regulating for preventing movement of the batteries, the spring forces of regulating springs 81, 82 and 83 of position regulating plates 71, 72 and 73 do not need to have anymore than the amount necessary to support the mass of battery A, and do not need to have large spring forces so as to withstand an impact force, so that it is possible to make the device more compact and the battery A insertion operation easier.

In this manner, position regulating plates 72 and 73 as well as ejection springs 52 and 53 use a member which has multiple functions, reduction in number of components, simplification of structure, whereby a reduction in manufacturing cost of the device can be achieved.

Also, as battery A is ejected a fixed amount when lid body 38 is opened, by urging forces of ejection springs 51, 52 and 53 of ejection urging part 50, thickness judging part 60, and contact point part 40, battery A can be taken out with efficient usability. The ejecting forces generated by these members are set to generate larger forces as the external shape of respective batteries A1, A2 and A3 increase, that is, thickness H1, H2 and H3, as well as to satisfy the Conditional expression 1 or Conditional expression 1-1, so that all kinds of batteries A can be securely ejected regardless of the attitude direction of the storage apparatus 10.

Moreover, the device provides appropriate ejecting forces to respective batteries A1, A2 and A3 without causing unnecessary ejecting force to battery A, so that the durability of the lid body 38, hook part 38b, and hook receiving part 34a that consist of the locking means, can be improved.

Also, since first through third position regulating plates 71, 72 and 73 of the position regulating plate part 70 of the position regulating part 69 rotate and slide in the receding direction when battery A is inserted, and slide in the biting direction when battery A is ejected, the required force can be reduced, thus improving the usability, during the insertion of battery A, while the battery can be prevented from being ejected excessively by generating a larger sliding resistance during the ejecting of battery A.

Position regulating plate part 70 of the position regulating part 69 can securely regulate the position of battery A, even when battery A has a flat external shape, since multiple position regulating plates 71, 72 and 73 that are provided rotatably being urged by regulating springs 81, 82 and 83 vary corresponding to the external shape of battery A. Therefore, battery A and storage compartment 25 are not required to be formed in a particular concave or convex shape for a regulating or retaining position, thereby the external shape can be formed with flat surfaces.

Therefore, there is no need to have small concave or convex shapes in battery A and storage compartment 25, thus making it possible to improve the strength and ease in handling. For example, it becomes necessary to replace the entire piece if damage occurs on a concave or convex part formed on battery A and storage compartment 25 by the plastic molding, making it difficult to repair them, but the device according to the present embodiment reduces the parts that can be damaged and durability is improved readily.

Since position regulating plate part 70 of the position regulating part 69 is configured as a unit structure, it is easier to repair when damage occurs and can reduce the maintenance cost.

When the external dimension of battery A, which is the object of storage, is changed, or when a battery A of a different shape is to be added, it can be easily accommodated by modifying or adding a position regulating plate of the position regulating plate part 70.

In addition, in each abovementioned embodiment, as thickness judging switches 61, 62 and 63, thickness judging part 60 is provided independently from position regulating plate part 70 and ejection urging part 50, however, it is also possible to form thickness judging part 60 integrally with position regulating plate part 70 or ejection urging part 50, that is, to use position regulating plate part 70 or ejection urging part 50 as thickness judging part 60.

Figure 5:
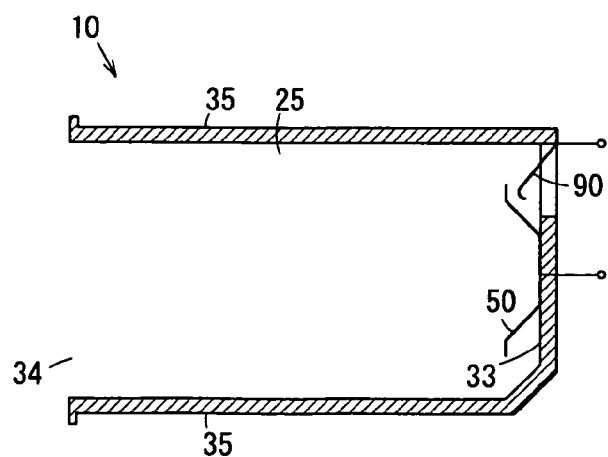
FIG. 5 is a partial cross section of the thickness judging part of said storage apparatus of another embodiment.

For example, as shown in FIG. 5, if it is formed integrally with ejection urging part 50, it is possible to consist of thickness judging part 60 by forming ejection springs 51, 52 and 53 of ejection urging part 50 abutting battery A inserted into storage compartment 25 with metallic members such as metal plates having electric conductivity, making ejection springs 51, 52 and 53 function as movable contacts, and providing contact point 90 in opposition to these ejection springs 51, 52 and 53, thus achieving simplification of the configuration, reduction in number of components and reduction in manufacturing cost. In this configuration, since load F60 of thickness judging part 60 described in relation to Conditional expression 1.1 does not exist, other ejecting loads, such as the ejecting load of ejection urging part 50 must be set larger.

Also, in a case where it is formed integrally with position regulating plate part 70, it is possible to provide a conductivity pattern (not shown) that corresponds to the rotary position on axis receiving parts 71*b*, 72*b* and 73*b*, or axis part 75 of position regulating plates 71, 72 and 73, and a brush switch to contact with said conductivity pattern, so that respective position regulating plates 71, 72 and 73 can also function as switches by detecting the conductivity between the conductivity pattern and the brush switch. In this configuration, simplification of the configuration, reduction in the number of components, and reduction in the manufacturing cost can be achieved.

Figure 6:
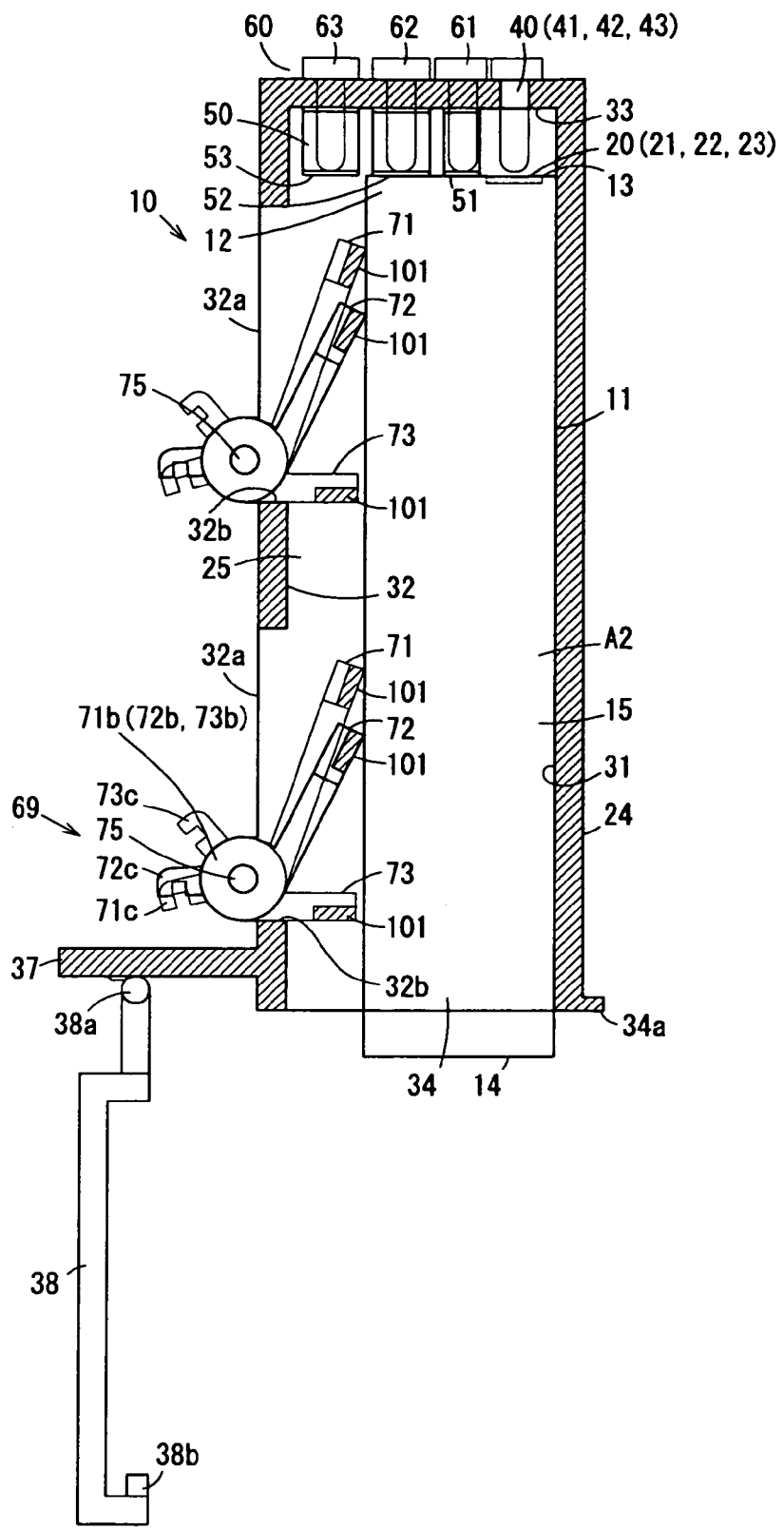
FIG. 6 is a cross sectional view of a second embodiment of the invention where the second battery is loaded with the lid open and the insertion port is directed downward.
Figure 8:
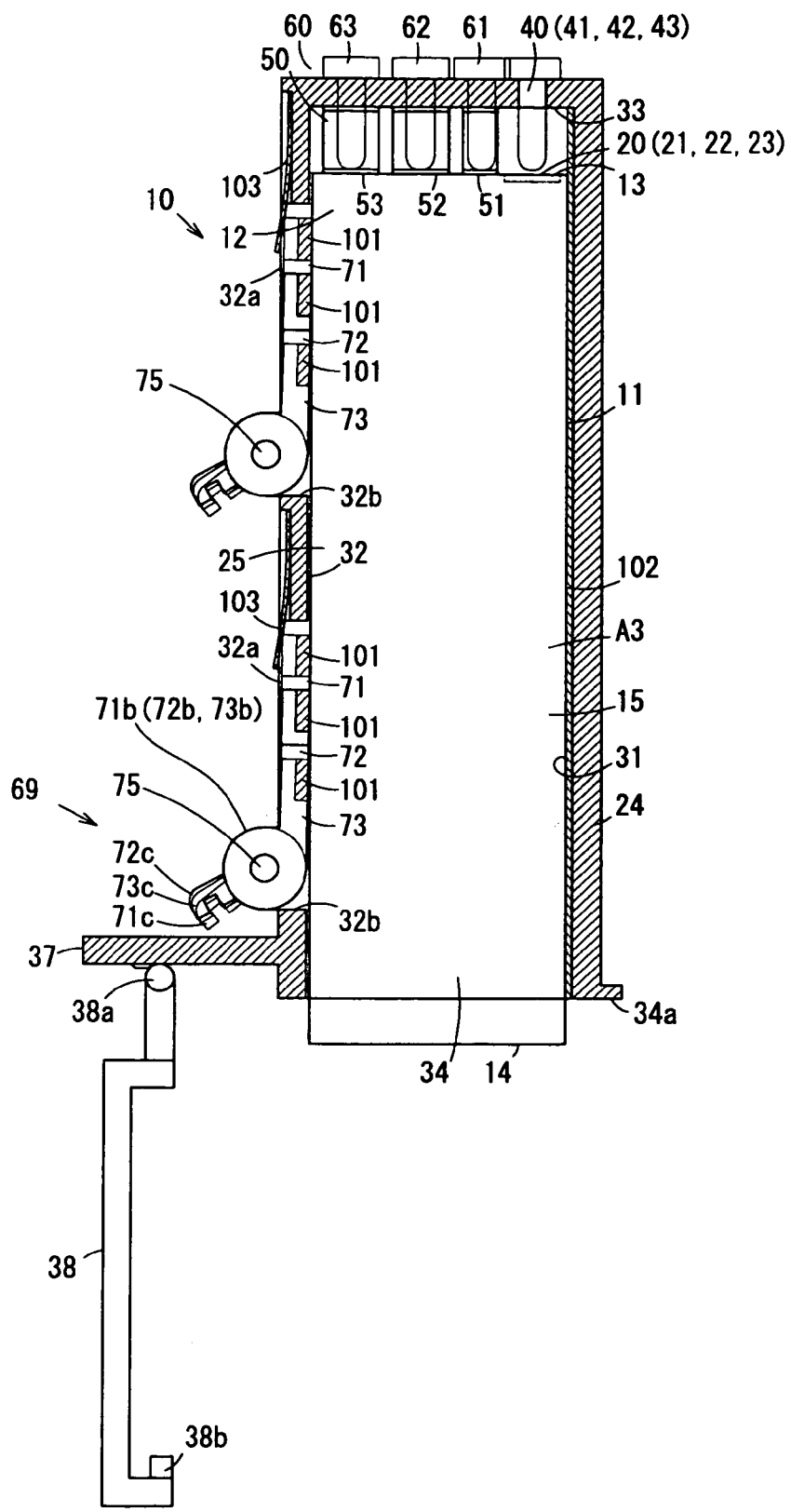
FIG. 8 is a cross sectional view of the second embodiment of the invention with yet another configuration where the third battery is loaded with the lid open and the insertion port is directed downward.

Next, with reference to FIG. 6 and FIG. 8, the second embodiment is described.

The second embodiment provides a fall prevention structure that maintains a condition of battery A being ejected a fixed amount when the battery A which is box-shaped is unloaded, regardless of the attitude direction of the storage apparatus 10, for example, even if the attitude direction of the storage apparatus 10 is in the attitude direction of battery A to fall due to gravity, battery A ejected from the storage compartment 25 is maintained to prevent falling.

Figure 7:
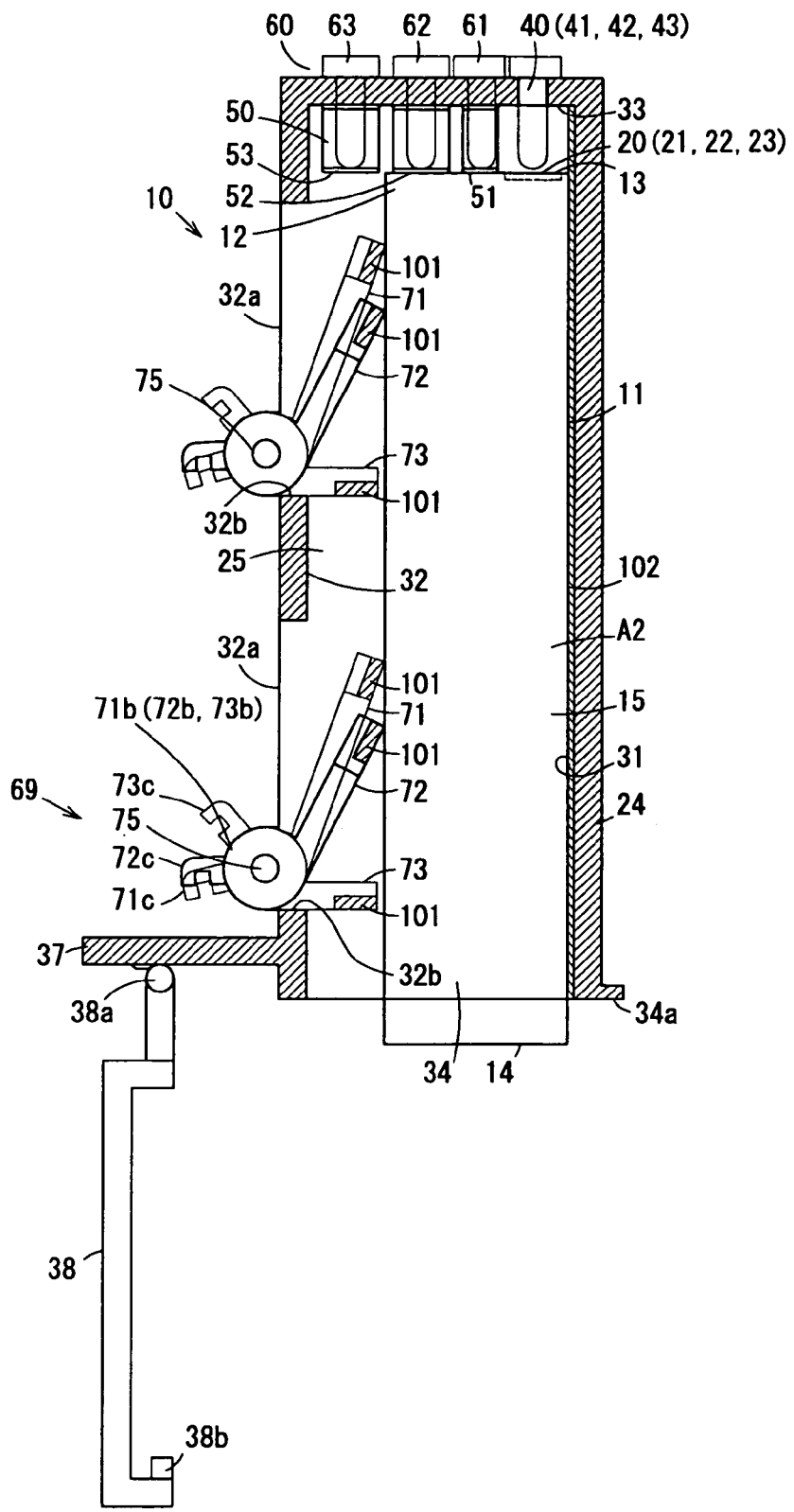
FIG. 7 is a cross sectional view of the second embodiment of the invention with another configuration where the second battery is loaded with the lid open and the insertion port is directed downward.

FIG. 6 through FIG. 8 shows a condition of battery A being ejected a fixed amount from storage compartment 25 with lid body 38 being opened, or a condition prior to closing of the lid body 38 after inserting battery A in storage compartment 25, wherein battery A is being held by friction resistance when storage apparatus 10 is in an attitude where battery A may fall due to gravity. FIG. 6 or FIG. 7 show a case where second battery A2 is inserted, and FIG. 8 shows a case where third battery A3 of the largest thickness dimension is inserted.

This second embodiment, as shown in FIG. 6, in addition to the configuration of the first embodiment, comprises: a contact part 101 with a specific friction resistance load provided on a part, which is to be in contact with battery A, of first through third position regulating plates 71, 72 and 73 of each position regulating plate part 70; a friction resistance member 102 with a prescribed friction resistance provided on bottom surface part 31 of the storage compartment 25 as shown in FIG. 7; and an urging part 103 provided on ceiling surface 32 of the storage compartment 25 for causing contact part 101 of the position regulating plate 73 to be pressed against third battery A3 having the maximum thickness as shown in FIG. 8, whereas other configurations of members such as contact point part 40, ejection urging part 50 and thickness judging part 60 are identical to the first embodiment.

In other words, since contact part 101 is provided for the part, which is to be in contact with opposing surface 12 of respective batteries A1, A2 and A3, of position regulating plates 71, 72 and 73 that causes reference surface 11 of battery A to move to the other side of bottom surface part 31 of the storage compartment 25 by the urging forces of regulating springs 81, 82 and 83, friction resistance load generated between contact part 101 and opposing surface 12 easily prevents the free fall out of battery A. Herein, pressing weight that first through third position regulating plates 71, 72 and 73 urged by regulating spring 81, 82 and 83 to the opposing surface 12 of battery A pressed on bottom surface part 31 of the storing compartment 25 increases as the external shape of battery A increases, proportionally increasing the friction resistance load as well. While friction part 101 is formed by gluing a member having a larger friction resistance than that of a member that consists of position regulating plates 71, 72 and 73 to position regulating plates 71, 72 and 73, however, besides bonding, it can be also formed by coating a different member or by means of fitting such as snap fitting. This configuration provides that the member for regulating the position of battery A is used as a fall prevention member during ejection, so that an increase in the number of components are suppressed.

Friction resistance member 102 of bottom part 31 of the storage compartment 25 is provided as needed as a supplement for the load of the contact part 101 in the fall prevention direction, and allows to increase the friction resistance load in the fall prevention direction without increasing the urging force of regulating springs 81, 82 and 83. Friction resistance member 102 is also formed by bonding a different member or coating, etc.

Furthermore, urging part 103 presses the contact part 101 of third position regulating plate 73 that abuts opposing surface 12 of third battery A3 when third battery A3 having the maximum thickness dimension is inserted, so that third battery A3 is pressed on friction resistance member 102 of bottom surface part 31, sandwiches battery A3 between urging part 103 and friction resistance member 102 in addition to contact part 101, thus increasing the friction resistance load in the fall prevention direction without increasing the urging forces of regulating springs 81, 82 and 83. Also, urging part 103 consists of an urging means, which is an elastic member such as a plate spring, attached to ceiling part 32 of the storage compartment 25.

In addition, in this configuration, even when battery A is inserted, friction resistance load is generated between opposing surface 12 of battery A and contact part 101 or urging part 103, and between reference surface 11 of battery A and friction resistance member 102, and the inserting capacity increases. However, since contact part 101 of the position regulating plate part 70 acts in the receding direction, it acts only partially as a load resistance in the insertion direction, and in the ejecting direction since it acts in the biting direction, all load resistances can be made to act.

Next, loading and unloading operation of battery A is described.

First, with reference to FIG. 6, a configuration where contact part 101 is provided and friction resistance member 102 and urging part 103 are not provided is described.

In FIG. 6, the procedures from insertion of battery A2 up to causing it to abut ejection springs 51, 52 and 53; thickness measuring switches 61, 62 and 63; and contact points 41, 42 and 43 are the same as in the first embodiment, and the present condition is such that reference surface 11 of battery A2 is pressed to bottom surface part 31 of the storage compartment 25 by the load of regulating springs 81, 82 and 83 (not shown).

In this manner, second battery A2 is inserted, after it abuts respective ejection springs 51, 52 and 53; thickness measuring switches 61, 62 and 63; and contact points 41, 42 and 43, prior to closing lid body 38, even second battery A2 is in an attitude which falls due to gravity, the same position as the ejection position can be maintained in a condition where second battery A2 is inserted, in other words, in a locked condition, because of the friction resistance load in the biting direction generated between opposing surface 12 of the second battery A2 and contact part 101 of position regulating plates 71 and 72, which are urged by regulating springs 81 and 82.

In other words, position regulating plates 71, 72 and 73 are functioning as a fall prevention member in addition to being a position regulating means.

In addition, although the above description concerned second battery A2, the same thing can be said for first battery A1 and third battery A3 except that first battery A1 reaches a condition where it is held by the friction resistance load of the contact part 101 of the first position regulating plate 71 urged by regulating spring 81, while third battery A3 reaches a condition where it is held by the friction resistance load of the contact part 101 of first through third position regulating plates 71, 72 and 73 urged by regulating springs 81, 82 and 83.

In this connection, the load relational expression to satisfy the condition where battery A is held in the ejecting position and fall prevention is carried out are, wherein WA is the mass of battery A; F101 is the friction resistance load of the contact part 101 of the position regulating plate part 70 corresponding to batteries A1, A2 and A3; F50 is the load of ejection urging part 50; F40 is the load of the contact point part 40; and F60 is the load of thickness judgment part 60;

$$F50+F40+F60>F101+WA \qquad \text{(Conditional expression 2-1)}$$

and $$F101>WA \qquad \text{(Conditional expression 2-2)}$$

further, in place of Conditional expression 2-1, if the following Conditional expression are satisfied;

$$F50>F101+WA \qquad \text{(Conditional expression 2-11)}$$

it is possible to eject the battery only with the load of ejection urging part 50.

In addition, herein, the pressing weight that position regulating plates 71, 72 and 73 urged by regulating spring 81, 82 and 83 to the reference surface 11 of battery A pressed on bottom surface part 31 of the storing compartment 25 increases as the external shape of battery A increases, proportionally increasing the friction resistance load of the contact part 101 as well.

The friction resistance load is generated between opposing surface 12 of battery A and each contact part 101 of respective position regulating plates 71, 72 and 73 not only during ejection but also during insertion of battery A, thus increasing the insertion capacity. However, since contact part 101 of the position regulating plate part 70 acts in the receding direction, it acts only slightly as a load resistance in the insertion direction, and in the ejecting direction since it acts in the biting direction, all load resistances can be made to act to effectively prevent the battery A from falling.

Next, with reference to FIG. 7, a configuration where contact part 101 and friction resistance member 102 are provided and urging part 103 is not provided is described.

In this configuration, in addition to the configuration of FIG. 6, a reduction in the sizes of regulating springs 81, 82 and 83 and contact part 101 as well as an improvement in durability is achieved by bonding friction resistance member 102 having a friction resistance load on bottom surface part 31 of the storage compartment 25 or by means of coating, etc., thus adding a supplemental force in the fall prevention direction.

Although each operation in this configuration is identical to those of the configuration of FIG. 6 above, the load relational expression to satisfy the fall prevention condition differs, specifically, the weight relation conditional expression to satisfy the condition of holding battery A in the ejecting position and preventing it from falling is as follows, wherein WA is the mass of battery A; F101 is the friction resistance load of the position regulating plate part 70 corresponding to batteries A1, A2 and A3; F102 is the friction resistance load of the friction resistance member 102 of the storage compartment 25; F50 is the load of ejection urging part 50; F40 is the load of the contact point part 40; and F60 is the load of thickness judgment part 60;

$$F50+F40+F60>F101+F102+WA \qquad \text{(Conditional expression 2-3)}$$

and $$F101+F102>WA \qquad \text{(Conditional expression 2-4)},$$

further, if the following Conditional expression is satisfied in place of Conditional expression 2-3:

$$F50>F101+F102+WA \qquad \text{(Conditional expression 2-31)},$$

it is possible to eject the battery only with the load of ejection urging part 50.

Also, in this configuration, the friction resistance load is generated between opposing surface 12 of battery A and each contact part 101 of position regulating plates 71, 72 and 73, and between reference surface 11 of battery A and friction resistance member 102 of bottom surface part 31 of the storage compartment 25, not only during ejection but also during insertion of battery A, thus increasing the required insertion capacity. However, since contact part 101 of the position regulating plate part 70 acts in the receding direction, the friction resistance load is increased only slightly as a load resistance in the insertion direction, and in the ejecting direction since it acts in the biting direction, all load resistances can be made to act to effectively prevent the battery A from falling.

Next, with reference to FIG. 8, a configuration where urging part 103 is provided in addition to contact part 101 and friction resistance member 102 is described.

In the configuration shown in FIG. 6 and FIG. 7, if the mass W3 of third battery A3 is substantially larger than those of other batteries when loading third battery A3 with the maximum thickness dimension, it is necessary to increase the friction resistance proportionally by increasing the urging force of the position regulating spring 83 and increasing the size of the contact part 101 provided on position regulating plate 73.

In this connection, urging part 103 is provided on ceiling surface 32 of the storage compartment 25 so as to increase the friction resistance load in the fall prevention direction only when the third battery A3 is inserted, and when the third battery A3 is inserted, contact part 101 of third position regulating plate 73 is pressed to abut opposing surface 12 of third battery A3, that is, contact part 101 of third position regulating plate 73 is sandwiched between opposing surface 12 of third battery A3 and urging part 103, and press against opposing surface 12 of third battery A3, result in adding pressuring load of urging part 103 to pressing load of the regulating spring 83 of third positioning plate 73, thereby the friction resistance load in the fall prevention direction can be increased without increase in the urging force of the regulating springs 81, 82 and 83.

Also, in the configuration shown in FIG. 8, the cases of first and second batteries A1 and A2 are identical to those shown in FIG. 6 and FIG. 7, so that the load relational expression are identical to Conditional expression 2-1 and Conditional expression 2-4.

In this connection, the load relational expression to satisfy the condition of holding third battery A3 in the ejecting position and preventing it from falling is as follows, wherein WA is the mass of battery A; F101 is the friction resistance load of the contact part 101 of the position regulating plate part 70 corresponding to third battery A3; F102 is the friction resistance load of the friction resistance member 102 of the storage compartment 25; F103 is an increased part of the friction resistance load according to urging part 103; F50 is the load of ejection urging part 50; F40 is the load of the contact point part 40; and F60 is the load of thickness judgment part 60;

$$F50+F40+F60>F101+F102+F103+WA \quad \text{(Conditional expression 2-5)}$$

and $$F101+F102+F103>WA \quad \text{(Conditional expression 2-6)}$$

further, if the following Conditional expression is satisfied in place of Conditional expression 2-3:

$$F50>F101+F102+F103+WA \quad \text{(Conditional expression 2-51)},$$

it is possible to eject the battery only with the load of ejection urging part 50.

Also, in this configuration, since an insertion capacity of the third battery A3 is increased, an insertion capacity substantially equivalent to fall prevention load (F101+F102+F103) is generated. On the other hand, the cases of first and second batteries A1 and A2 are identical to the configuration shown in FIG. 7 described above, and since the friction resistance load is generated between opposing surface 12 of battery A and each contact part 101 of respective position regulating plates 71, 72 and 73 as well as between reference surface 11 of battery A and friction resistance member 102 of bottom surface part 31 of the storage compartment 25, not only during ejection but also during insertion of battery A, the insertion capacity increases. However, since contact part 101 of the position regulating plate part 70 acts in the receding direction, the friction resistance load is increased only partially as a load resistance in the insertion direction, and in the ejecting direction since it acts in the biting direction, all load resistances can be made to act to effectively prevent the battery A from falling.

And, from the conditions shown in FIG. 6 and FIG. 8, by closing lid body 38, similar to the first embodiment, battery A can be loaded and held in the prescribed position.

Next, operations for unloading battery A are described.

In the configuration shown in FIG. 6, when lid body 38 is opened as in the case of the first embodiment from the condition wherein battery A is loaded battery A, for example, regarding second battery A2, the battery A is ejected by the ejecting load, which is the combination of the ejecting loads of ejection springs 51 and 52 that consist of the ejecting means (load F50=F51+F52), contact points 41, 42 and 43 (load F40), and thickness judging switches 61 and 62 (load F60=F61+F62).

In this case, contact part 101 of first and second position regulating plates 71 and 72 (load F101) press against opposing surface 12 of battery A and generates friction resistance load to prevent the battery from falling.

And, combined ejecting load described above ejects battery A to a position where ejection springs 51, 52 and 53 abut against the friction resistance load for fall prevention, so that it makes it possible for the operator to hold battery A in hand and take it out from storage compartment 25 with ease.

And, the load relational expression in this case must satisfy the condition that battery A can be ejected to the abutting position (ejecting position) regardless of the attitude of the storage apparatus 10, and does not cause battery A at the abutting position to fall even when storage apparatus 10 is in a position where the attitude of the battery A is in the direction of gravity fall.

In addition, the ejecting load of the first battery A1 is the combined ejecting loads of the first ejection spring 51 (load F50=F51), contact points 41, 42 and 43 (load F40), and thickness judging switch 61 (F60=F61), and the friction resistance load is generated by contact part 101 of the first position regulating plate 71 of each position regulating plate part 70 (load F101). Also, the ejecting load of third battery A3 is the combined ejecting loads of first through third ejection springs 51, 52 and 53 (load F50=F51+F52+F53), contact points 41, 42 and 43 (load F40), and thickness judging switches 61, 62 and 63 (F60=F61+F62+F63), and the friction resistance load is generated by contact part 101 of first through third position regulating plates 71, 72 and 73 of each position regulating plate part 70 (load F101).

In this connection, the load relational expression expressed using the representative value of each load is as follows, wherein WA is the mass of battery A; F101 is the friction resistance load of the position regulating plate part 70 corresponding to respective batteries A1, A2 and A3; F50 is the load of ejection urging part 50; F40 is the load of the contact point part 40; and F60 is the load of thickness judgment part 60;

$$F50+(F40+F60)>F101+WA \quad \text{(Conditional expression 3-1)}$$

and $$F50+(F40+F60)>F101>WA \text{ are satisfied,} \quad \text{(Conditional expression 3-2)}$$

by the combined ejecting load, in all the attitude direction of the storage compartment 25, for example, in the gravity load direction of the battery A, that is, even in a condition where the insertion port 34 is facing upward, the battery A is ejected to the position where all the batteries A can be easily taken out or even in a condition where insertion port 34 is facing downward, all the batteries A are prevented from falling in the gravity direction due to its own weight.

Moreover, if the following Conditional expression are satisfied;

$$F50>F101+WA \quad \text{(Conditional expression 3-11)}$$

and $$F50>F101>WA \quad \text{(Conditional expression 3-21)}$$

battery A can be ejected only by the load of the ejection springs of ejecting urging part 50.

The load F50 of the ejection urging part 50 of the storage apparatus 10 so as to satisfy these Conditional Expressions 3-1 through 3-21 becomes large as the thickness dimension H of the battery A increases larger, having an ejecting force corresponding to the mass W1, W2 and W3 of respective batteries A1, A2 and A3, in all attitude directions of the storage apparatus 10, after ejecting batteries A1, A2 and A3 a fixed amount from the insertion port 34 of the storage compartment 25 of respective batteries A1, A2 and A3, the battery A can be taken out with efficient usability. Furthermore, combined load of regulating springs 81, 82 and 83 that urge contact part 101 of each position regulating plate part 70 becomes larger as the thickness dimension of battery A increases larger, and the friction resistance load for fall prevention, so that it is possible to prevent battery A from falling due to its own weight in all attitude directions of the storage apparatus 10.

Next, with reference to FIG. 7, the unloading operation in the structure for which the contact point part 101 and the friction resistance member 12 are provided but the urging part 103 is not provided is described.

In this configuration, in addition to the configuration shown in FIG. 6, a friction resistance member 102 having a friction resistance load is formed on the bottom surface part 31 of the storage compartment 25 by means of bonding, thereby increasing in friction resistance load F102.

When the load relational expression is expressed using the representative value of each load as follows, wherein WA denotes the mass of battery A; F101 denotes the friction resistance load of the position regulating plate part 70 corresponding to the respective batteries A1, A2 and A3; F102 denotes the friction resistance load of the friction resistance member 102 of the storage compartment 25; F50 denotes the load of ejection urging part 50; F40 is the load of the contact point part 40; and F60 denotes the load of thickness judgment part 60;

$$F50+(F40+F60)>F101+F102+WA \quad \text{(Conditional expression 4-1)}$$

and $$F50+(F40+F60)>F101+F102>WA \text{ are satisfied}\text{(Conditional expression 4-2)}$$

whereby, in all attitude directions of the storage compartment 10, for example, even in the attitude of the gravity load direction of the battery A, in turn, in a condition where the insertion port 34 faces upward, the battery A can be ejected to a position which is easy to take out and falling of the battery A can be prevented due to its own weight of the battery A in the gravity direction due to the combined ejection load.

Moreover, if the following Conditional expressions are satisfied;

$$F50>F101+F102+WA \quad \text{(Conditional expression 4-11)}$$

and $$F50>F101+F102>WA \quad \text{(Conditional expression 4-21)},$$

the battery A can be ejected only by the load of the ejection springs of ejecting urging part 50.

Thus, the friction resistance member 102 having a friction resistance load is provided on the bottom surface part 31 of the storage compartment 25, thereby supplying a supplementary force in the fall prevention direction by means of the contact part 101 of the position regulating plate part 70, securing a sufficient load for preventing battery A from falling even if the urging forces of regulating springs 81, 82 and 83 are reduced, and securely preventing all batteries A from falling.

Next, with reference to FIG. 8, the unloading operation of a configuration for which urging part 103 is provided in addition to contact part 101 and friction resistance member 102 is described.

In the configuration shown in FIG. 8, the cases of first and second batteries A1 and A2, operations are identical to the configurations shown in FIG. 6 and FIG. 7, and the load relational expression is identical to Conditional expression 4-1 and Conditional expression 4-21.

On the other hand, when third battery A3 with the maximum thickness dimension is loaded, urging part 103 press contacts part 101 of third position regulating plate 73, contact part 101 of third position regulating plate 73 is sandwiched between opposing surface 12 of third battery A3 and urging part 103, thereby the pressuring load of urging part 103 is added to the pressing load by regulating spring 83 of third position regulating plate 73.

When the load relational expression is expressed using the representative value of each load as follows, wherein WA denotes the mass of battery A; F101 denotes the friction resistance load of the position regulating plate part 70 corresponding to batteries A1, A2 and A3; F102 denotes the friction resistance load of the friction resistance member 102 of the storage compartment 25; F103 denotes the friction resistance load by means of urging part 103; F50 denotes the load of ejection urging part 50; F40 denotes the load of the contact point part 40; and F60 denotes the load of thickness judgment part 60;

$$F50+(F40+F60)>F101+F102+F103+WA \quad \text{(Conditional expression 4-1)}$$

and $$F50+(F40+F60)>F101+F102+F103>WA \text{(Conditional expression 4-2)}$$

whereby, due to the combined ejection load, in all attitude directions of the storage compartment 10, for example, even in the attitude of the gravity load direction of the battery A, in turn, in a condition where the insertion port 34 faces upward, the battery A can be ejected to a position which is easy to take out, and falling of the third battery A3 can be prevented due to its own weight of the battery A3 in the gravity direction even when the battery A3 is heavier than the other batteries A1 and A2.

Moreover, if the following Conditional expressions are satisfied;

$$F50>F101+F102+F103+WA \quad \text{(Conditional expression 4-2)}$$

and $$F50>F101+F102+F103>WA \quad \text{(Conditional expression 4-21)}$$

battery A can be ejected only by the ejection spring of ejection urging part 50, and all batteries A including third battery A3 can be securely ejected.

In turn, in a case where the third battery A3 of the greatest size is loaded, contact part 101 of each position regulating plate part 70 abuts opposing surface 12 of third battery A3 at a shallow angle, the fall prevention force that acts in the biting direction may be reduced, in the embodiment of the present invention, in a case where the third battery A3 of the greatest size is loaded, contact part 101 is sandwiched between opposing surface 12 of third battery A3 and urging part 103 to cause contact part 101 to be pressed on third battery A3, thereby increasing the friction resistance load so that all batteries A including third battery A3 can be securely prevented from falling.

Thus, according to the second embodiment, in addition to the effect of the first embodiment where all batteries A can be ejected a fixed amount by increasing the ejecting force as the external shape of a battery becomes larger, in the ejecting operation of battery A, contact parts 101 provided in the position regulating plates 71, 72, and 73 act in the biting direction, therefore, load resistance can be efficiently acted, and battery A can be held at a condition where the battery A is ejected a fixed amount and battery A can be securely prevented from falling due to its own weight.

Contact parts 101 for preventing the battery from falling are provided for position regulating plates 71, 72 and 73 that regulate the positions of the batteries during and after the battery insertion, and function as parts, whereby improvements in component durability and a reduction in the size of the device can easily be realized.

As position regulating plates 71, 72 and 73 rotate in the receding direction when battery A is inserted, the resistance in the insertion can be reduced, and productivity can be improved.

In addition, it is preferable to provide not only friction resistance member 102 on bottom surface part 31 of the storage compartment 25 but also contact parts 101 on position regulating plates 71, 72 and 73 in order to efficiently hold battery A by allowing the force to act in the biting direction and improve productivity and durability by reducing the insertion load.

Urging part 103 may be constituted so that not only contact part 101 of third position regulating plate 73, but also contact part 101 of other position regulating plates 71 and 72 press against third battery A3.

Figure 9:
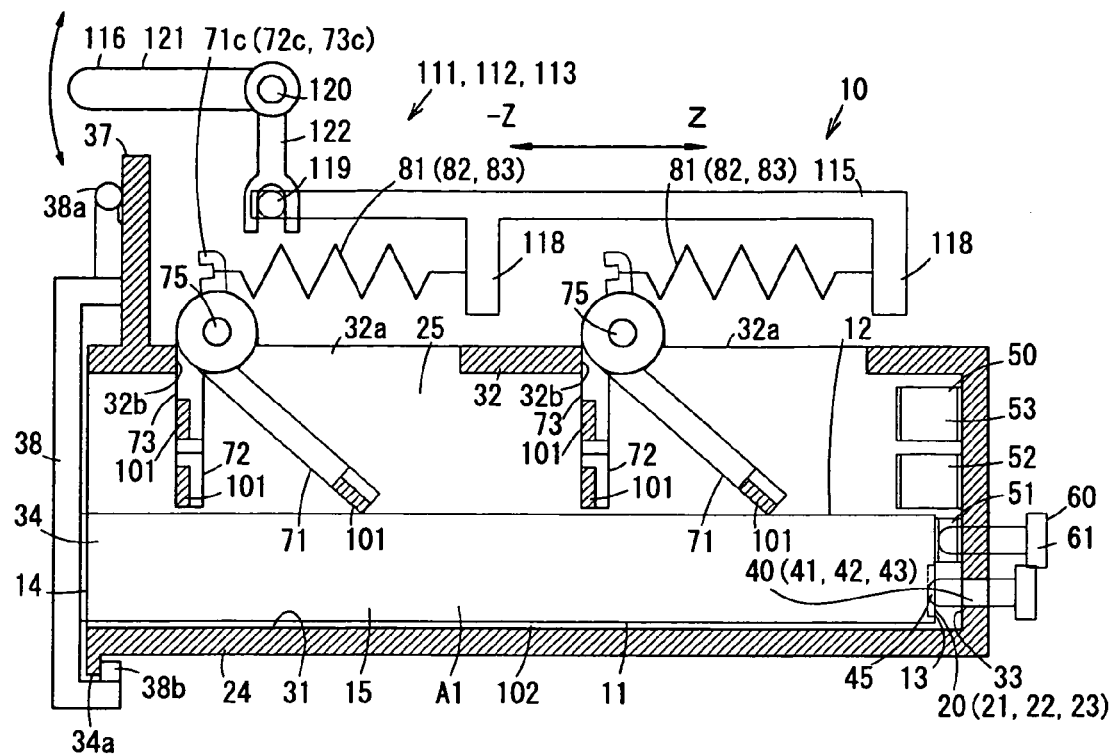
FIG. 9 is a cross sectional view of a third embodiment of the present invention where the first battery is stored.

Next, with reference to FIG. 9, a third embodiment of the present invention is described.

In each configuration of the embodiment described above, the third embodiment is constituted so that the pressing loads of regulating springs 81, 82 and 83 that urge movable-rotation first through third position regulating plates 71, 72 and 73 of the position regulating plate part 70 that abut opposing surface 12 of battery A can be adjusted. In other words, in the first and second embodiments described above, also in a case where the mass is changed due to a change in initial settings, friction coefficient accompanied by changes in limitations of durability performance and a change over time, or a change in specifications of battery A even when the shape is identical, as shown in the first embodiment, a mechanism can be secured in such a manner that battery A is pressed on the bottom surface part 31 of the storage compartment 25 so as to be positioned and held, and as shown in the second embodiment, battery A is ejected only a fixed amount so as to prevent falling due to its own weight.

In this structure, in addition to the structures of first and second embodiments, urging force adjusting means 111, 112 and 113 are provided for regulating springs 81, 82 and 83, respectively, wherein each urging force adjusting means 111, 112 or 113 is equipped with a spring adjustment locking member 115, an adjusting lever 116 and a locking mechanism (not shown). Spring adjustment locking member 115 is provided for a holding member (not shown) and is equipped with spring connecting parts 118 and 118, which are provided along the direction of inserting battery A (Z, –Z direction) in an extendable and retractable manner, and to which one end of regulating springs 81, 82 and 83 are connected instead of the fixed part 85, and an engaging part 119, which is connected to adjusting lever 116. Adjusting levers 116 are provided in an independently rotatable manner around an axis 120, respectively, and is equipped with an operating part 121 that extends from axis 120 and an acting axis 122 extending from axis 120 in a different direction. The distal end of each operating axis 122 is connected rotatably to engaging part 119 of the spring adjustment locking member 115. Rotating the operating part 121 causes spring adjustment locking member 115 to slide, which causes regulating spring 81, 82 or 83 to expand or shrink, thus adjusting the urging force. The locking mechanism locks the movement of the adjusting lever 116, that is, spring adjustment locking member 115, or allows movement.

Next, the adjustment operation will be described.

The adjustment operation is performed in the order of the first regulating spring 81, second regulating spring 82 and third regulating spring 83.

First, with respect to urging force adjusting means 111 that corresponds to first regulating spring 81 for urging first position regulating plate 71 that abuts first battery A1 in the clockwise direction t, adjustment is performed such that the locking mechanism is operated to release the lock and operate adjusting lever 116 to slide adjustment locking member 115, to cause regulating spring 81 to expand or shrink in order to adjust the load, so that first battery A1 does not freely fall even when storage apparatus 10 is brought into an attitude in which first battery A1 would fall due to gravity before lid body 38 is opened. After the adjustment, adjusting lever 116 and adjustment locking member 115 are fastened by means of the locking mechanism.

Next, after finishing the load adjustment for first battery A1, the adjustment of the second battery A2 is performed. With respect to urging force adjusting means 112 that corresponds to second regulating spring 82 for urging second position regulating plate 72 that abuts second battery A2 in the clockwise direction t, adjustment is performed, such that the lock mechanism is opened to release the lock and operate adjusting lever 116 to slide adjustment locking member 115, to cause regulating spring 82 to expand or shrink in order to adjust the load, so that second battery A2 does not freely fall even when storage apparatus 10 is brought into an attitude in which second battery A2 would fall due to gravity before lid body 38 is opened. After the adjustment, adjusting lever 116 and adjustment locking member 115 are fastened by means of the locking mechanism.

Next, after finishing the load adjustment for second battery A2, the adjustment of third battery A3 is performed. With respect to urging force adjusting means 113 that corresponds to third regulating spring 83 for urging third position regulating plate 73 that abuts third battery A3 in the clockwise direction t, adjustment is performed, such that the lock mechanism is opened to release the lock and operate adjusting lever 116 to slide adjustment locking member 115, to cause regulating spring 83 to expand or shrink in order to adjust the load, so that third battery A3 does not freely fall even when storage apparatus 10 is brought into an attitude in which third battery A3 would fall due to gravity before lid body 38 is opened. Following the adjustment, adjusting lever 116 and adjustment locking member 115 are fastened by means of the locking mechanism.

It is possible to eliminate the adjusting mechanism, if load F50 of ejection urging part 50 is set to an estimated maximum value of mass WA of battery A in the initial setting in order to satisfy the Conditional expression for ejecting battery A by a fixed amount, Next, the operations for readjusting the urging force while the device is being used are described.

More specifically, described is a method of adjusting the pressing loads of regulating springs 81, 82 and 83 of the position regulating urging part 80 as a solution for a case wherein battery A cannot be pressed against bottom surface part 31 of the storage compartment 25 for positioning and holding the position as indicated in the first embodiment, or it becomes impossible to satisfy the load relational expression for ejecting the battery A by a fixed amount and preventing the fall out of battery A due to gravity as indicated in the second embodiment, due to reasons such as limit in the device's durability, chronological changes in friction coefficients, or change in mass despite the same external shape due to changes in specifications of battery A.

Herein, described is a method of holding first battery A1 in a press-contacted state by means of increasing the load of the regulating spring 81, when it cannot be held, in a press-contacted state, against its reference surface 11 on bottom surface part 31 of the storage compartment 25 while storage compartment 10 is brought into an attitude in which the entire mass of the first battery A1 applies to position regulating plate part 70, in a structure where first battery A1 is stored in storage compartment 25, contact part 101 of the first position regulating plate 71 of each position regulating plate part 70 is abutting opposing surface 12 of the first battery A1, and reference surface 11 of the first battery A1 is held, in a press-contacted state, against bottom surface part 31 of the storage compartment 25.

First, lid body 38 is opened to bring first battery A1 into a position similar to the one shown in FIG. 4 of the first embodiment, and bring storage apparatus 10 into an attitude in which the entire mass of the first battery A1 applies to position regulating plate part 70. When the locking mechanism (not shown) is unlocked, thus enabling adjusting lever 116 of urging force adjusting means 111 is allowed to rotate around axis 120, thereby rotate operating part 121 of the adjusting lever 116 counterclockwise. Adjustment locking member 115 connected to adjusting lever 116 by engaging part 119 then slides toward the back (Z direction) of the storage compartment 25, causing regulating spring 81 to be expanded and the load to be increased, so that the pressing force exceeds the mass of the first battery A1, that is, (W1+α). After checking by visual inspection and other means where reference surface 11 of the first battery A1 is held, in a press-contacted state, against bottom surface part 31 of the storage compartment 25, adjusting lever 116 by the locking mechanism is fastened.

It is possible to make adjustments for second and third batteries A2 and A3 as well by rotating corresponding adjusting levers 116 of urging force adjusting means 112 and 113 counterclockwise to expand regulating springs 82 and 83 to increase the loads so that the pressing forces exceed the masses of batteries A2 and A3, e.g., W2+α and W3+α.

It must be noted here, however, that the adjustment of urging force adjusting means 112 for second battery A2 must be done after the adjustment of urging force adjusting means 111 for first battery A1, and the adjustment of urging force adjusting means 113 for third battery A3 must be done after the adjustment of urging force adjusting means 111 and 112 for first and second batteries A1 and A2.

After checking by visual inspection and other means that reference surfaces 11 of the second and third batteries A2 and A3 are held, in a press-contacted state, against bottom surface part 31 of the storage compartment 25, adjusting levers 116 are fastened by the locking mechanisms.

Next, with reference to FIG. 9, in a structure wherein first battery A1 is stored in storage compartment 25, contact part 101 of the first position regulating plate 71 of each position regulating plate part 70 is abutting opposing surface 12 of the first battery A1, and reference surface 11 of the first battery A1 is held, in a press-contacted state, against bottom surface part 31 of the storage room 25, described is the method of preventing battery A from freely falling in the gravity direction while increasing the load of the regulating spring 81 and ejecting the battery A by a fixed amount, when it is impossible to satisfy the load relational expression for ejecting the battery A of the second embodiment by a fixed amount and preventing the battery A from freely falling.

The structure used here is such that the adjustment according to the load relational expression (Conditional expression 3-1) is made unnecessary by setting load F50 of ejection urging part 50 to an estimated maximum value of mass WA of battery A in the initial setting in order to satisfy the Conditional expression for ejecting battery A by a fixed amount.

First, storage apparatus 10 is brought into an attitude to cause first battery A1 to fall due to gravity and lid body 38 is opened, so that first battery A1 comes to a position as indicated in FIG. 6 of the second embodiment. Then, adjusting lever 116 of urging force adjustment means 111 is operated as described in the above to expand regulating spring 81 to increase the load in order to satisfy the load relational expression (Conditional expression 3-2) described in the second embodiment, so that first battery A1 does not freely fall due to gravity when it is ejected by a fixed amount The load at this time shall satisfy the following conditional expression, wherein WA is the mass of battery A; F101 is the friction resistance load of the position regulating plate part 70 corresponding to batteries A1, A2 and A3; F50 is the load of ejection urging part 50; F40 is the load of the contact point part 40; and F60 is the load of thickness judgment part 60;

$$F50+(F40+F60)>F101>WA \qquad \text{(Conditional expression 3-2)}$$

Moreover, if battery A is ejected only with the load of the ejection spring of ejection urging part 50, the following Conditional expression shall be satisfied:

$$F50>F101>WA \qquad \text{(Conditional expression 3-21)}$$

By satisfying the load relational expression, it becomes possible to prevent battery A from falling in a gravity direction due to its own weight in the entire direction of the attitude of the storage apparatus 10, and hold battery A in a position where the battery A is easily taken out by means of the friction resistance load of the contact part 101 that acts in the biting direction, while the battery A is ejected by a fixed amount.

After confirming that first battery A1 does not freely fall in a gravity direction by visual inspection or other means, adjusting lever 116 is fastened by the locking mechanism.

It is also possible to prevent second and third batteries A2 and A3 from freely falling in a gravity direction and hold second and third batteries A2 and A3 in positions where they are easily taken out by means of the friction resistance loads of the contacting parts 101 that act in the biting direction, by performing adjustment such as rotating counterclockwise, respectively corresponding adjusting levers 116 of urging force adjusting means 112 and 113 to expand regulating springs 82 and 83 and to increase the loads in order to satisfy the load relational expression (Conditional expression 3-2).

It must be noted here, however, that the adjustment of urging force adjusting means 112 for second battery A2 must be done after the adjustment of urging force adjusting means 111 for first battery A1, and the adjustment of urging force adjusting means 113 for third battery A3 must be done after the adjustment of urging force adjusting means 111 and 112 for first and second batteries A1 and A2.

After confirming that second and third batteries A2 and A3 do not freely fall in a gravity direction by visual inspection or other means, adjusting levers 116 are fastened by the locking mechanisms.

Although the structure described in the above employs a non-adjustment method such that the adjustment according to the load relational expression (Conditional expression 3-1) is not performed by setting load F50 of ejection urging part 50 to an estimated maximum value of mass WA of battery A in the initial setting in order to satisfy the Conditional expression for ejecting battery A by a fixed amount, it is also possible to adopt a structure where the loads of regulating springs 81, 82 and 83 can be adjusted.

As can be seen from the above, according to the third embodiment, it is possible to prevent the falling of a battery reliably even when the friction coefficient changes due to product durability and chronological changes as well as when the mass changes despite the external shape of the battery being the same because the adjustment mechanism is provided for adjusting the pressing loads of regulating springs 81, 82 and 83 of the position regulating urging part 80.

Although, in the above-described structure shown in FIG. 9, adjusting levers 116 rotate around axis 120 to cause adjustment locking member 115 to slide and regulating springs 81, 82 and 83 that are tensile coil springs to expand and contract in order to adjust the loads, the invention is not limited to such a structure and an urging force adjusting means can also be configured by combining rotary dials and lead screws.

Moreover, although tensile coil springs are used as regulating springs 81, 82 and 83 in the abovementioned embodiment, it is also possible to use an urging means using torsion coil springs and plate springs and constitute an urging force adjusting means corresponding to such an urging means.

Figure 10:
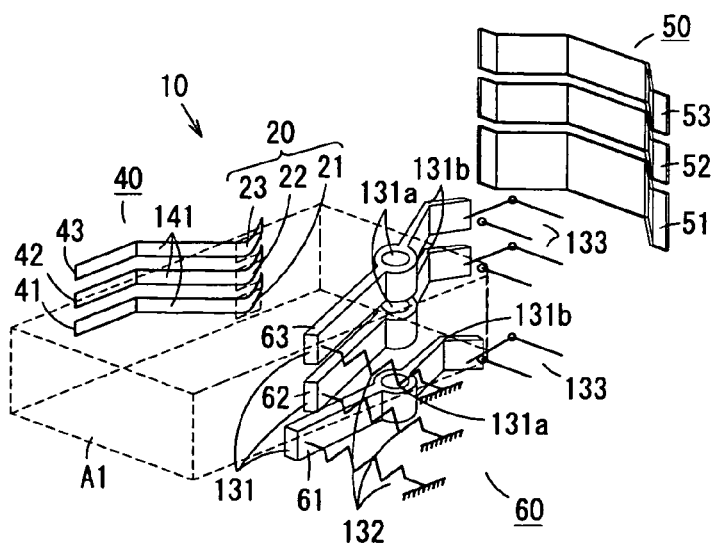
FIG. 10 is a perspective view of a fourth embodiment of the present invention where the first battery is stored.

Next, with reference to FIG. 10, the fourth embodiment is described.

In the fourth embodiment, concerning each of the above mentioned embodiments, the method of regulating positions and preventing falls out of batteries A1, A2 and A3 will be described wherein only an ejection urging part 50 is provided on end surface 33 at the back side of the storage compartment 25, while contact point part 40 and thickness judging part 60 that are other contact members exerting pressure forces are provided on surfaces other than end surface 33 at the back side of the storage compartment 25.

FIG. 10 is a perspective view where first battery A1 is loaded in storage compartment 25, wherein thickness judging part 60 is provided on a side surface part 35 on one side (X side) of the storage compartment 25 and contact point part 40 is provided on the other side (−X side). Although this storage compartment 25 is provided with, similar to those in other embodiments described above, a pair of position regulating plate parts 70 of the position regulating part 69, that is, first through third position regulating plates 71, 72 and 73, regulating springs 81, 82 and 83, lid body 38 and others, they are not shown in the drawing for the sake of simplicity of description.

Ejection urging part 50 of this structure is, similar to those in other embodiments described above, provided with three ejection springs 51, 52 and 53 that are elastic deformation members for ejecting battery A in an elastically deformable manner on end surface 33 at the back side of the storage compartment 25, in correspondence with a plurality of batteries of different shapes. The ejecting force of ejection urging part 50 that combines the urging forces of ejection springs 51, 52 and 53 is provided to increase the ejecting as the thickness dimensions H1, H2 and H3 of batteries A1, A2 and A3 increase so as to satisfy the following Conditional expressions 7-1 and 7-2, and the lower end surfaces of ejection springs 52 and 53 that are not abutting battery A face opposing surface 12 of battery A across a prescribed space, thus providing position regulating in the thickness direction of batteries A.

Also, in order to be able to abut side surface 15 of battery A in correspondence with batteries A1, A2 and A3, respectively, first through third thickness judging switches 61, 62 and 63 of thickness judging part 60 are equipped with operating levers 131 that are provided in a protruding manner into storage compartment 25 from side surface part 35 of the storage compartment 25 and in a rotatable manner, respectively, springs 132 that urge operating levers 131 as an urging means, and switch main bodies 133 that are turned on and off in line with rotation of acting levers 131. An abutting part 131b made of a member that has a friction resistance load is provided on the portion of each acting lever 131 that abuts side surface 15 of battery A. When battery A is inserted, abutting part 131b of acting lever 131 of thickness judging switches 61, 62 and 63 that is pressed against side surface 15 of battery A rotates around axis 131a from the inside of the storage compartment 25 to the outside and turns on switch main body 133, that is, makes it conductive.

Friction resistance loads of abutting parts 131b of thickness switches 61, 62 and 63 in regard to batteries A1, A2 and A3 are designed so that the friction resistance loads increase as the thickness dimensions H1, H2 and H3 of batteries A1, A2 and A3 increase similar to those of the position regulating plate part 70, and among acting levels 131 of the thickness judgment switches 61, 62 and 63, with respect to those which do not abut side surface 15 of battery A, the lower edges of acting levers 131 face opposing surface 12 of battery A across a prescribed space to regulate the position of battery A in its thickness direction similar to ejection springs 51, 52 and 53 of the first embodiment.

In other words, as acting lever 131 of the first thickness judgment switch 61 rotates and corresponding switch main body 133 turns on for first battery A1, the lower edge of acting lever 131 of the second thickness judging switch 62 simultaneously faces opposing surface 12 of the first battery A1 across a prescribed space to regulate the position of the first battery A1 in the thickness direction.

Moreover, as acting levers 131 of first and second thickness judgment switches 61 and 62 rotate and two corresponding switch main bodies 133 turn on for second battery A2, the lower edge of acting lever 131 of third thickness judging switch 63 simultaneously faces opposing surface 12 of the second battery A2 across a prescribed space to regulate the position of the second battery A2 in the thickness direction.

As for the third battery A3, acting levers 131 of first through third thickness judging switches 61, 62 and 63 rotate and three corresponding switch main bodies 133 turn on.

Although a slight friction resistance load is generated as battery A is inserted due to rubbing against abutting part 131b made of a member that has a friction resistance, its effect is no more than increasing the insertion load slightly and causes no problem in the insertion.

As can be seen from the above, in the fourth embodiment as in other embodiments, the position regulating of battery A in the thickness direction is carried out at a combined three locations, that is, in addition to position regulating plate parts 70 and 70 of the position regulating part 69 and ejection urging part 50, and thickness judgment part 60 as well.

In the present embodiment, three terminals 21, 22 and 23 of terminal part 20 of battery A are provided on the same position of another side surface 15 and first through third contact points 41, 42 and 43 are provided so as to protrude from the other side surface part 35 of the storage compartment 25 in correspondence with terminals 21, 22 and 23. In other words, first through third contact points 41, 42 and 43 are equipped with elastically deformable and plate-like contact members 141 having electrical conductivity, which is attached on holding members (not shown), and these contact members 141 abut terminals 21, 22 and 23, respectively, to establish electrical continuity in a press-contacted state.

When lid body 38 is closed after inserted battery A abuts ejection urging part 50, ejection springs 51, 52 and 53 corresponding to batteries A1, A2 and A3 will be pushed in, loaded and held into the prescribed position.

Friction resistance loads are generated on abutting parts 131b of acting levers 131 of thickness judging switches 61, 62 and 63, and contact members 141 that abut terminals 20 of batteries A, and act as supplementary forces for fall out preventing load by position regulating plate parts 70 and 70 of the position regulating part 69.

After battery A is inserted and this battery A has abutted ejection urging part 50, thickness judging part 60, and contact point part 40, but before lid body 38 is closed, battery A is held reliably at a position ejected by a fixed amount from storage compartment 25 even if battery A is brought into an attitude of falling out in a gravity direction since the friction resistance loads of thickness judging part 60 and contact point part 40 are added on the friction resistance load in the biting direction where contact parts 101 of first through third position regulating plates 71, 72 and 73 make contact with opposing surface 12 of battery A, which are urged by regulating springs 81, 82 and 83.

Next, described is the loading and unloading of battery A to the storage compartment according to the fourth embodiment. The descriptions of position regulating plate parts 70 and 70 of the position regulating part 69, that is, first through third position regulating plate 71, 72 and 73, regulating springs 81, 82 and 83, ejection urging part 50, and lid body 38 that perform operations in similar manners as embodiments described above are omitted.

First, the operation to load battery A is described.

When first battery A1 is inserted into storage compartment 25 through insertion port 34 with lid body 38 open, it abuts rotatable position regulating plates 71, 72 and 73 that are protruding into storage compartment 25 urged by regulating springs 81, 82 and 83 of position regulating parts 70 and 70 of the position regulating part 69. Opposing surface 12 of the first battery A1 is pressed, and reference surface 11 of the first battery A1 is pressed against bottom surface part 31 of the storage compartment 25.

First battery A1 thus inserted is pressed against first thickness judging switch 61 among a plurality of abutting parts 131b of acting levers 131 of thickness judging switches 61, 62 and 63 that are urged by springs 132 and protruding from side surface part 35 of the storage compartment 25, causing acting lever 131 to rotate around axis 131a from the inside of the storage compartment 25 to the outside thus establishing electrical continuity for switch main body 133.

At this time, the lower edge of acting lever 131 of the second thickness switch 62 faces opposing surface 12 of the first battery A1 across a prescribed space to regulate the position of the first battery A1 in the thickness direction.

Contact members 141 attached to holding members (not shown) of first through third contact points 41, 42 and 43 abut terminals 21, 22 and 23 provided at the same position of each battery A to establish electrical continuity in a press-contacted state, respectively.

When the operator releases his/her grip on first battery A1 when it abuts ejection spring 51 and closes lid body 38, ejection spring 51 is pushed in, in an elastically deforming state. As he further locks lid body 38, first battery A1 becomes fully loaded and held in the prescribed position.

During this insertion, friction resistance loads are generated on abutting part 31b of acting lever 131 of thickness judging switches 61 and on contact member 141 that is pressed against terminal part 20 of battery A, thus increasing the inserting force.

It can also be configured to have such a positional relationship that the electrical continuities between terminal parts 20 of battery A and three terminals 21, 22 and 23 as well as first through third contact points 41, 42 and 43 are established after battery A has abutted ejection springs 51, 52 and 53 of ejection urging part 50.

It can also be configured in a manner of providing members that increase the friction resistance load on abutting parts 131b of acting levers 131 of thickness judging part 60 that abut one side surface 15 of battery A, so that supplementary force for preventing its falling out can be enhanced.

When battery A is inserted to abut ejection urging part 50, thickness judgment part 60 and contact point part 40, but before lid body 38 is closed, battery A is held in positions where they are ejected by a fixed amount from storage compartment 25 as a result of the load F40 of the contact point part 40 and load F60 of thickness judging part 60 being added to friction resistance load F101 generated in the biting direction between opposing surfaces 12 of battery A and contact parts 101, which are the friction resistance members of the position regulating plate part 70 pressed by regulating springs 81, 82 and 83.

The fall prevention load conditional expressions (Conditional expression 2-1) and (Conditional expression 2-2) of the second embodiment are as follows, where F40 and F60 are the friction resistance loads by contact members at contact point part 40 and thickness judging part 60, respectively, WA is the mass of each battery A, F101 is the friction resistance load of the contact part 101 of the position regulating plate part 70 that corresponds to each battery A1, A2 and A3, and F50 is the load of ejection urging part 50;

$$F50 > (F101 + F40 + F60) + WA \quad \text{(Conditional expression 6-1)}$$

and $$F101 + F40 + F60 > WA \quad \text{(Conditional expression 6-2)}$$

If these conditional expressions are satisfied, each A can be prevented from falling in a gravity direction due to its own weight and can be held in a position where it is ejected by a fixed amount.

Next, the operation of removing battery A will be described.

In the structure as shown in FIG. 10, battery A is ejected by a fixed amount due to the ejecting force of ejection urging part 50 when lid body 38 is opened and also held so as not to fall out by the friction resistance load acting in the biting direction of the contact part 101 of the position regulating plate part 70. The differences between the present embodiment and the first through third embodiments are in that battery A is ejected by the ejecting force of the ejection urging part 50 alone when lid body 38 is opened when battery A is in a loaded condition, and in that load F40 of the contact point part 40 that causes pressing of contact points 41, 42 and 43 of the contact part 40 against terminals 21, 22 and 23 of terminal part 20 and F60 of thickness judging part 60 that causes abutting parts 131b of acting levers 131 to press side surface 15 of battery A act together as friction resistance loads in the direction opposite the ejecting direction, thus acting as an a supplementary force for the fall prevention load according to the friction resistance load of the position regulating plate part 70.

The fall prevention load conditional expressions (Conditional expression 3-1) and (Conditional expression 3-2) of the second embodiment are as follows, where F40 and F60 are the friction resistance loads by contact members at contact point part 40 and thickness judging part 60, respectively, WA is the mass of each battery A, F101 is the friction resistance load of the contact part 101 of the position regulating plate part 70 that corresponds to each battery A1, A2 and A3, and F50 is the load of ejection urging part 50;

$$F50>(F101+F40+F60)+WA \quad \text{(Conditional expression 7-1)}$$

and $$F50>F101+F40+F60>WA \quad \text{(Conditional expression 7-2)}$$

If these Conditional expressions are satisfied, in the entire attitude direction of the storage apparatus 10, for example, even in the case where battery A is brought into an attitude in a gravity direction, that is, insertion port 34 is facing upward, the battery A can be ejected to a position where it is easily taken out and battery A is prevented from falling out in a gravity direction due to its own weight.

Taking out battery A, which is ejected by a fixed amount, by hand and closing lid body 38 completes the battery unloading process.

Second and third batteries A2 and A3 can be ejected in a similar operation, except that second battery A2 is ejected by first and second ejection springs 51 and 52, while third battery A3 is ejected by first through third ejection springs 51, 52 and 53, and the ejecting force of ejection urging part 50 that combines the urging forces of all ejection springs 51, 52 and 53 is designed so that the force increases as thickness dimensions H1, H2 and H3 of batteries A1, A2 and A3 increase in order to satisfy said Conditional expressions 7-1 and 7-2, while the regulating of the positions of battery A in the thickness direction is accomplished as the lower edges of ejection springs 52 and 53 face opposing surface 12 of battery A across a prescribed space.

As for the friction resistance loads of abutting parts 131b of acting levers 131 of thickness judging part 60 corresponding to second and third batteries A2 and A3, the friction resistance load for second battery A2 is provided by abutting parts 131b of first and second thickness judging switches 61 and 62, and the same for third battery A3 is provided by abutting parts 131b of first through third thickness judging switches 61, 62 and 63, so that the greater the thickness dimensions H1, H2 and H3 of batteries A1, A2 and A3, the greater the friction resistance loads as in the friction resistance load of the position regulating plate part 70. The lower edges of thickness judgment switches 62 and 63 that do not abut battery A face opposing surface 12 of battery A at a prescribed space to regulate the position of battery A in the thickness direction.

Although battery A, which is the object of the invention, in each of the abovementioned embodiments is assumed to have three different shapes, the invention is not limited to such a configuration, and can consist of two, four or more kinds of batteries.

Also, in each of the abovementioned embodiments, although position regulating plate part 70 is assumed to be provided at two locations in storage compartment 25, the invention is not limited to such a configuration, and can be provided at only one place or three or more places depending on the size and mass of battery A, which is the object.

Although it is omitted in the drawings of the abovementioned embodiments, it is possible to provide concave and convex shapes between battery A and storage compartment 25 that fit with each other, so that a shape for preventing insertion errors by regulating the direction of insertion for battery A can be provided.

Although it is described in each of the abovementioned embodiments that lid body 38 is supported to be able to rotate or slide and is urged in the insertion port direction and the slide lock direction so that releasing the lock of battery A is carried out by sliding lid body 38 to unlock it, rotating it in the direction of rotation of the lid body 38, and removing battery A through insertion port 34 of the storage compartment 25, the invention is not limited to such a configuration. For example, in addition to the configuration described above, the configuration is made possible in a manner where first pressed lid body 38 is urged into the insertion direction, that is, toward at the back side of the storage compartment 25, and allowing the operation to release the lock by sliding the lid body 38 so as to prevent from unintentionally unlocking.

Although lid body 38 is assumed to rotate by means of the lid spring 39 and is held at more than a 90° open position in each of the abovementioned embodiments, the invention is not limited to such a configuration and can be opened to any position that does not cause interference in inserting the object. For example, it can be opened to approximately 90° or can be opened to an angle less than 90° if it is separated from insertion port 34.

Lid body 38 can also be configured to provide only the locking function to hold the engagement of the stop part 32b and hook part 34a by means of an urging means such as a spring, or to be rotated manually.

Also, lid body 38 does not have to be opened or closed by rotation and the locking can be configured without using an urging means such as a spring. For example, lid body 38 can be configured to be opened or closed by sliding, and the lock can be accomplished by a separate locking member.

Although the descriptions for each of the abovementioned embodiments regarded a plurality of objects with different shapes and their storage apparatus and they concerned the regulating means of regulating the positions in the thickness direction of the objects, which are three kinds of batteries different only in thickness dimensions, the invention is not limited to such configurations but can be applied to a case where the regulating means is provided for a plurality of surfaces of the storage compartment, or to a case where the regulating is applied to the box-like objects, such as batteries, whose shapes vary in multiple places.

In each of the abovementioned embodiments, according to the connecting part and the connection receiving part, although the configuration comprising terminal part 20 and contact point part 40 that is electrically connected by physical contact with each other is described, the invention is not limited to it, and an electrical power supply or signal exchanges using an appropriate connecting part and connection receiving part can be carried out. Further, according to the connecting part and the connection receiving part, the invention is not limited to only a type where connection is made by physical contact, i.e. a charging device that charges batteries by a non-contact method, but can be realized by a non-contact type IC card reader device which provides a means for efficient charging and accurate signal transmission and receiving by means of accurately positioning and storing batteries and IC cards which is the object.

The invention can be applied not only to a storage apparatus for batteries having a plurality of shapes, but also to a storage apparatus for storing cards having a plurality of shapes such as memory cards. The present invention can be applied to a storage apparatus which stores plastic boxes or packing boxes such as cardboard boxes where the connecting part or connection receiving part do not have to prescribed locations.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A storage apparatus comprising:
   a storage compartment for storing an object;
   a reference receiving part provided in said storage compartment; and
   a plurality of regulating members that are pivotably supported in a rotatable manner and urged in a protruding direction towards said reference receiving part of said storage compartment, wherein
   at least one of said regulating members rotates opposing the urging force as it is pressed by said object, which is inserted into said storage compartment, and moves said object by pressing the object against said reference receiving part, while other regulating members are held in positions to oppose substantially perpendicular to said reference receiving part and said object.

2. A storage apparatus according to claim 1, wherein the larger the external size of the object is, the larger the urging force of the regulating members for moving the object by pressing it is set.

3. A storage apparatus according to claim 1 or 2, further comprising:
   an ejector for urging the object in the direction in which the object is ejected from the storage compartment; and
   a locking device for holding the object in a prescribed position of the storage compartment against the urging force of the ejector.

4. A storage apparatus according to claim 1 or 2,
   wherein a load in the ejecting direction provided by the ejector is set larger than a friction resistance load in the direction opposite the ejecting direction in which the regulating members abut the object, plus a load in the direction opposite the ejecting direction due to the mass of said object.

5. A storage apparatus comprising:
   a storage compartment for storing an object;
   a reference receiving part provided in said storage compartment;
   a regulating member which is pivotably supported in a rotatable manner and urged in a protruding direction towards said reference receiving part of said storage compartment and which has a contact part that abuts said object;
   an ejector for urging the object in the direction in which the object is ejected from the storage compartment; and
   a locking device for holding the object in a prescribed position of the storage compartment against the urging force of this ejecting means, wherein
   said regulating member rotates opposing the urging force as it is pressed by said object, which is inserted into said storage compartment, and moves said object by pressing it against said reference receiving part, while said contact part abuts said object and applies a prescribed friction resistance load in the direction opposite the ejecting direction.

6. A storage apparatus according to claim 5, wherein a load in the ejecting direction provided by the ejector is set to be larger than a friction resistance load in the direction opposite the ejecting direction in which the contact part of the regulating member abuts the object plus a load in the direction opposite the ejecting direction due to the mass of said object, and
   the friction resistance load in the direction opposite the ejecting direction in which the contact part of the regulating member abuts the object is set to be larger than the load in the ejecting direction due to the mass of said object.

7. A storage apparatus according to claim 5 or 6, wherein the larger the external size of the object is, the larger the load in the ejecting direction provided by the ejector is set.

8. A storage apparatus according to claim 5 or 6, wherein the larger the external size of the object is, the larger the friction resistance toad in the direction opposite the ejecting direction in which the contact part of the regulating member abuts the object, is set.

9. A storage apparatus according to claim 5 or 6, wherein said reference receiving part of the storage compartment is provided with a friction resistance member that generates a friction resistance load in the direction opposite the ejecting direction as a result of its abutting the object.

10. A storage apparatus according to claim 5 or 6, wherein said storage compartment is provided with an urging part that urges the regulating member toward said object side and causes the contact part to be pressed against said object when the maximum size object is loaded.

11. A storage apparatus according to claim 1, 2, 5, or 6, further comprising:
    an urging force adjustment device for adjusting the urging force to urge the regulating member.

12. A storage apparatus according to claim 1, 2, 5, or 6, further comprising:
    a connection receiving part to be connected with a connection part provided for the object.

13. A storage apparatus according to claim 1, 2, 5, or 6, further comprising:
    a connection receiving part to be connected wit a connection part provided for the object; and a thickness judging part for detecting the thickness dimensions of said object, wherein said connection receiving part and said thickness judging part apply loads in the ejecting direction to said object.

14. A storage apparatus according to claim 1, 2, 5, or 6, further comprising:
    a connection receiving part to be connected with a connection part provided for the object; and a thickness judging part for detecting the thickness dimensions of said object, wherein said connection receiving part and said thickness judging part apply loads in the direction opposite the ejecting direction to said object.

15. A storage apparatus according to claim 14, wherein
    the storage compartment comprises an insertion port; an ejection urging device disposed on an end surface opposing said insertion port; and a connection receiving part and a thickness judging part on a surface that crosses with said end surface.

16. A storage apparatus according to claim 14, comprising an abutting part with a friction resistance load on a part where it abuts the object.

17. A storage apparatus according to claim 14, wherein a load in the ejecting direction provided by the ejector is set larger than a friction resistance load in the direction opposite the ejecting direction in which the contact part of the regulating member abuts the object, plus a friction resistance load generated by the connection receiving part and thickness judging part in the direction opposite the ejecting direction as well as a load in the direction opposite the ejecting direction due to the mass of said object and the friction resistance load in the direction opposite the ejecting direction in which the contact part of the regulating member abuts the object, plus friction resistance load generated by said connection receiving part and said thickness judging part in the direction opposite the ejecting direction is set to be larger than the load in the ejecting direction due to the mass of said object.

18. A storage apparatus according to claim 17, wherein the larger the external shape of the object is, the larger the load in the ejecting direction provided by the ejector is set.

19. A storage apparatus according to claim 1, 2, 5, or 6, comprising at least one of an ejection urging part and a thickness judging part for detecting the thickness dimensions of an object inserted into the storage compartment, wherein at least one of these ejection urging part and thickness judging part has a plurality of members disposed along a prescribed direction in which said object dimension varies, and among the members, those that do not abut said object face said object spaced in said prescribed direction in order to regulate the position of said object in said prescribed direction.

20. A storage apparatus according to claim 1, 2, 5, or 6, comprising an ejection urging part and regulating member(s), either of said ejection urging part and regulating member functioning as a thickness judging part for detecting the thickness dimensions of an object inserted into the storage compartment.

21. A storage apparatus according to claim 1, 2, 5, or 6, further comprising a plurality of regulating members that face the object from a plurality of directions.

22. A storage apparatus to claim 1, 2, 5, or 6, wherein a fitting part is provided for the object and the storage compartment to be fitted with each other in order to prevent insertion errors.

23. A storage apparatus according to claim 1, 2, 5, or 6, wherein the object is a battery.

24. A storage apparatus according to claim 1, 2, 5, or 6, wherein the object is an IC card.

* * * * *

UNITED STATES PATENT AND TRADEMARK OFFICE
CERTIFICATE OF CORRECTION

PATENT NO.       : 7,466,912 B2  Page 1 of 1
APPLICATION NO.  : 10/800039
DATED            : December 16, 2008
INVENTOR(S)      : Kazuo Ishikawa et al.

It is certified that error appears in the above-identified patent and that said Letters Patent is hereby corrected as shown below:

Col. 40, Line 7
Claim 8, line 3     "toad" should be replace with --load--.

Col. 40, Line 29
Claim 13, line 3    "wit" should be replaced with --with--.

Col. 42, Line 7
Claim 22, line 1    After "apparatus" insert --according--.

Signed and Sealed this

Seventeenth Day of March, 2009

JOHN DOLL
*Acting Director of the United States Patent and Trademark Office*